(12) United States Patent
Gyoda

(10) Patent No.: US 12,174,356 B2
(45) Date of Patent: Dec. 24, 2024

(54) ZOOM LENS AND IMAGE CAPTURING APPARATUS INCLUDING THE SAME

(71) Applicant: CANON KABUSHIKI KAISHA, Tokyo (JP)

(72) Inventor: Yuichi Gyoda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 16/951,958

(22) Filed: Nov. 18, 2020

(65) Prior Publication Data

US 2021/0165196 A1 Jun. 3, 2021

(30) Foreign Application Priority Data

Nov. 28, 2019 (JP) ................................ 2019-215441

(51) Int. Cl.
*G02B 15/14* (2006.01)
*G02B 13/18* (2006.01)
*G02B 15/177* (2006.01)

(52) U.S. Cl.
CPC ...... *G02B 15/144511* (2019.08); *G02B 13/18* (2013.01); *G02B 15/177* (2013.01)

(58) Field of Classification Search
CPC .................. G02B 15/177; G02B 13/18; G02B 15/143503; G02B 15/144503; G02B 15/144511; G02B 15/14
USPC .......................... 359/686, 689, 676, 781, 725
See application file for complete search history.

(56) References Cited

U.S. PATENT DOCUMENTS

| 5,999,329 | A  | * | 12/1999 | Ohtake | ................ | G02B 15/177 |
| | | | | | | 359/686 |
| 8,472,125 | B2 | * | 6/2013 | Fukuta | ........... | G02B 15/143503 |
| | | | | | | 359/689 |
| 2006/0245078 | A1 | * | 11/2006 | Kawamura | .... | G02B 15/144511 |
| | | | | | | 359/689 |
| 2007/0019302 | A1 | * | 1/2007 | Fujisaki | ......... | G02B 15/143503 |
| | | | | | | 359/680 |

(Continued)

FOREIGN PATENT DOCUMENTS

CN 101029959 A 9/2007
CN 101191896 A 6/2008

(Continued)

OTHER PUBLICATIONS

Warren J. Smith; "Modern Lens Design;" A Resource Manual; Genesee Optics Software, Inc.; Jan. 1, 1992, McGraw-Hill, Inc., ISBN 978-0-07-059178-3; pp. 25-27.

*Primary Examiner* — Thomas K Pham
*Assistant Examiner* — Kuei-Jen L Edenfield
(74) *Attorney, Agent, or Firm* — Canon U.S.A., Inc. IP Division

(57) ABSTRACT

A zoom lens B0 includes a first lens unit B1 having negative refractive, a second lens unit B2 having positive refractive power, and a third lens unit B3 having negative refractive power in order from an object side to an image side. The first lens unit B1 moves during zooming. The first lens unit B1 includes a negative lens G1 disposed closest to the object side and at least one positive lens. Lenses included in the second lens unit B2 all have positive refractive power. The number of lenses included in the third lens unit B3 is two or less. The third lens unit B3 moves toward the image side during focusing from infinity to close range.

24 Claims, 17 Drawing Sheets

(56) References Cited

U.S. PATENT DOCUMENTS

| | | | |
|---|---|---|---|
| 2014/0022416 A1* | 1/2014 | Shinohara | H04N 5/23296 |
| | | | 359/686 |
| 2014/0354858 A1 | 12/2014 | Kawamura | |
| 2018/0275383 A1 | 9/2018 | Inoue | |
| 2019/0094490 A1 | 3/2019 | Gyoda | |

FOREIGN PATENT DOCUMENTS

| CN | 104423025 A | 3/2015 |
|---|---|---|
| JP | H11-084242 A | 3/1999 |
| JP | 2005-275280 A | 10/2005 |
| JP | 2014-178388 A | 9/2014 |
| JP | 2014-235190 A | 12/2014 |

\* cited by examiner

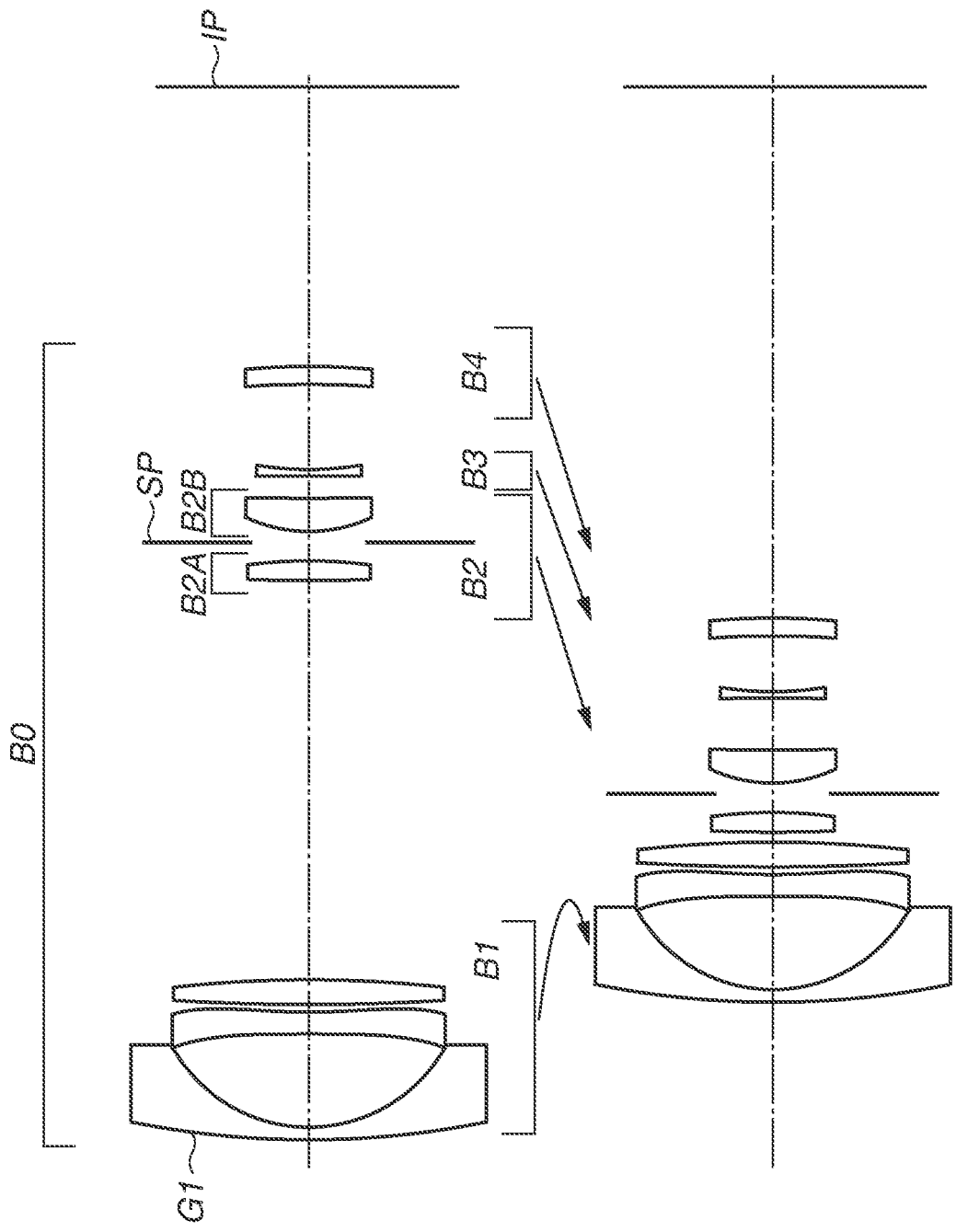
FIG. 1A WIDE ANGLE END
FIG. 1B TELEPHOTO END

WIDE ANGLE END

TELEPHOTO END

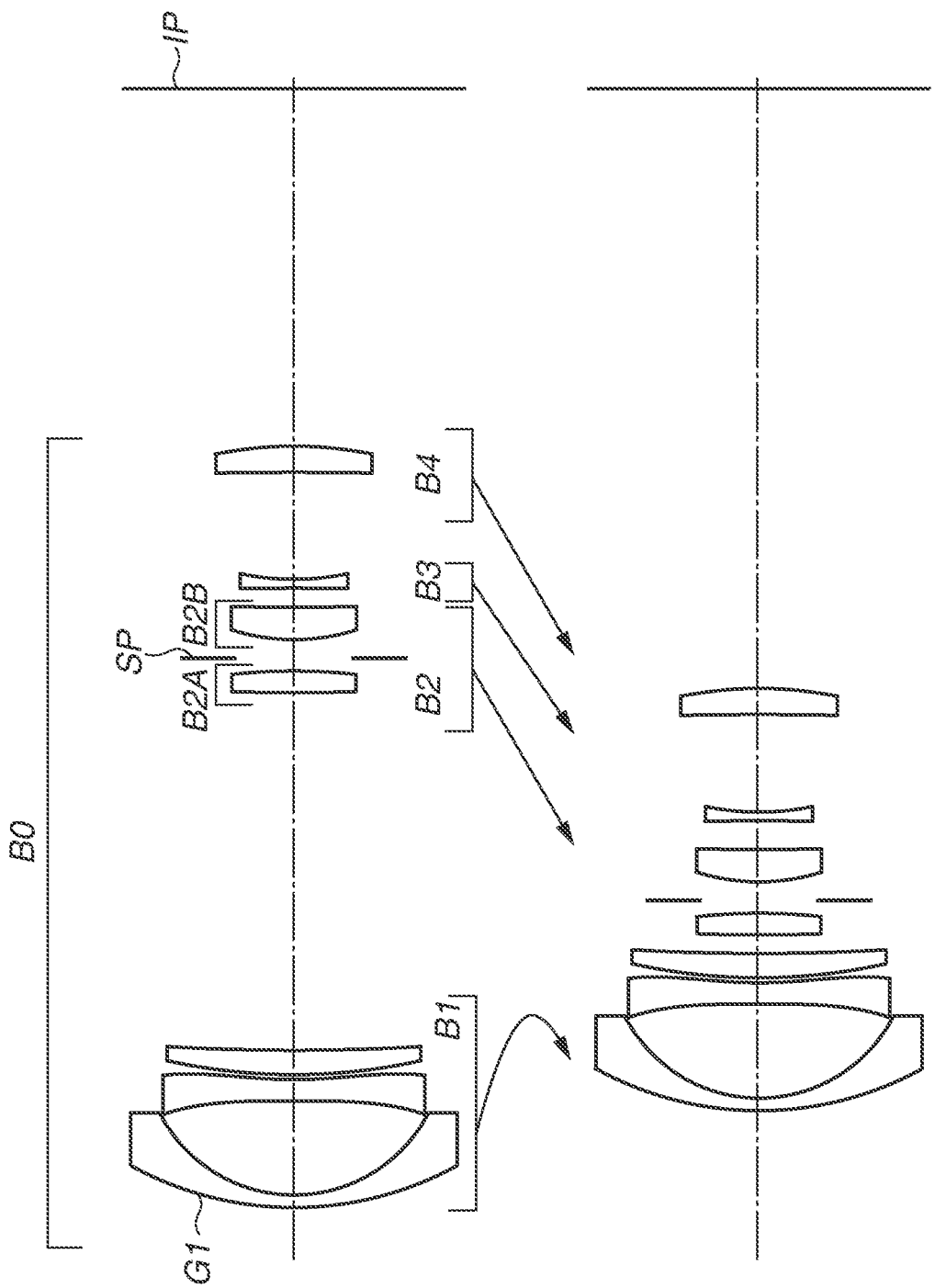
FIG. 3A WIDE ANGLE END
FIG. 3B TELEPHOTO END

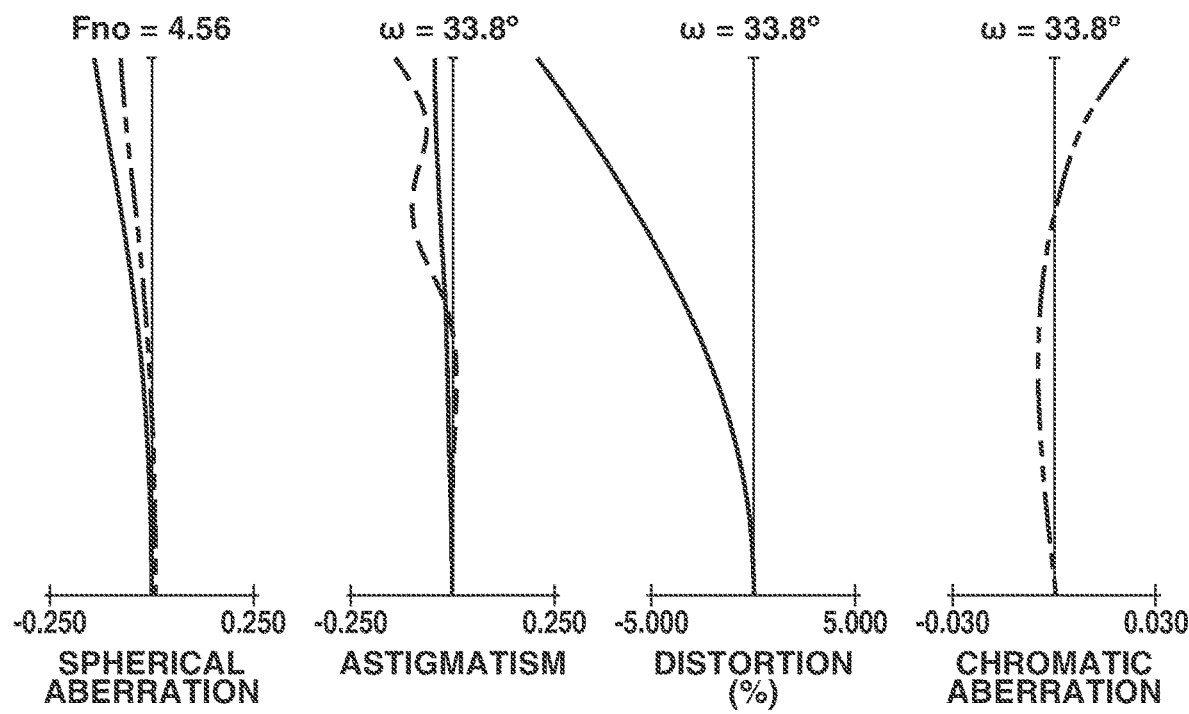
FIG.4A WIDE ANGLE END
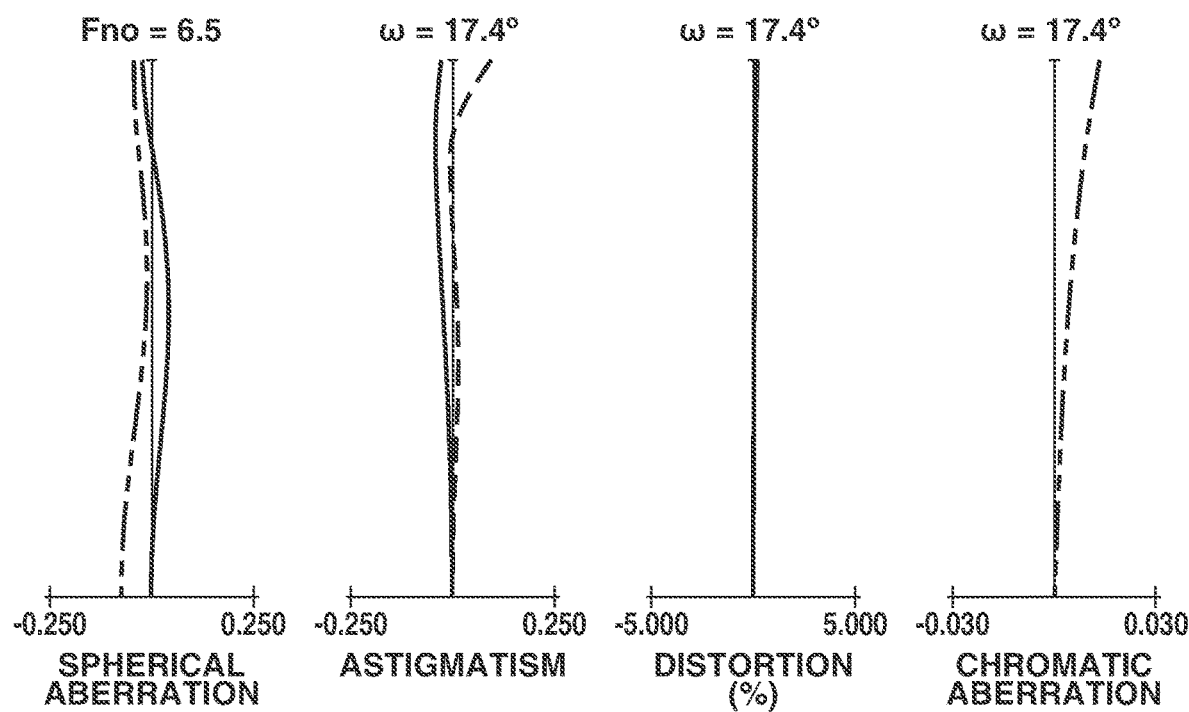
FIG.4B TELEPHOTO END

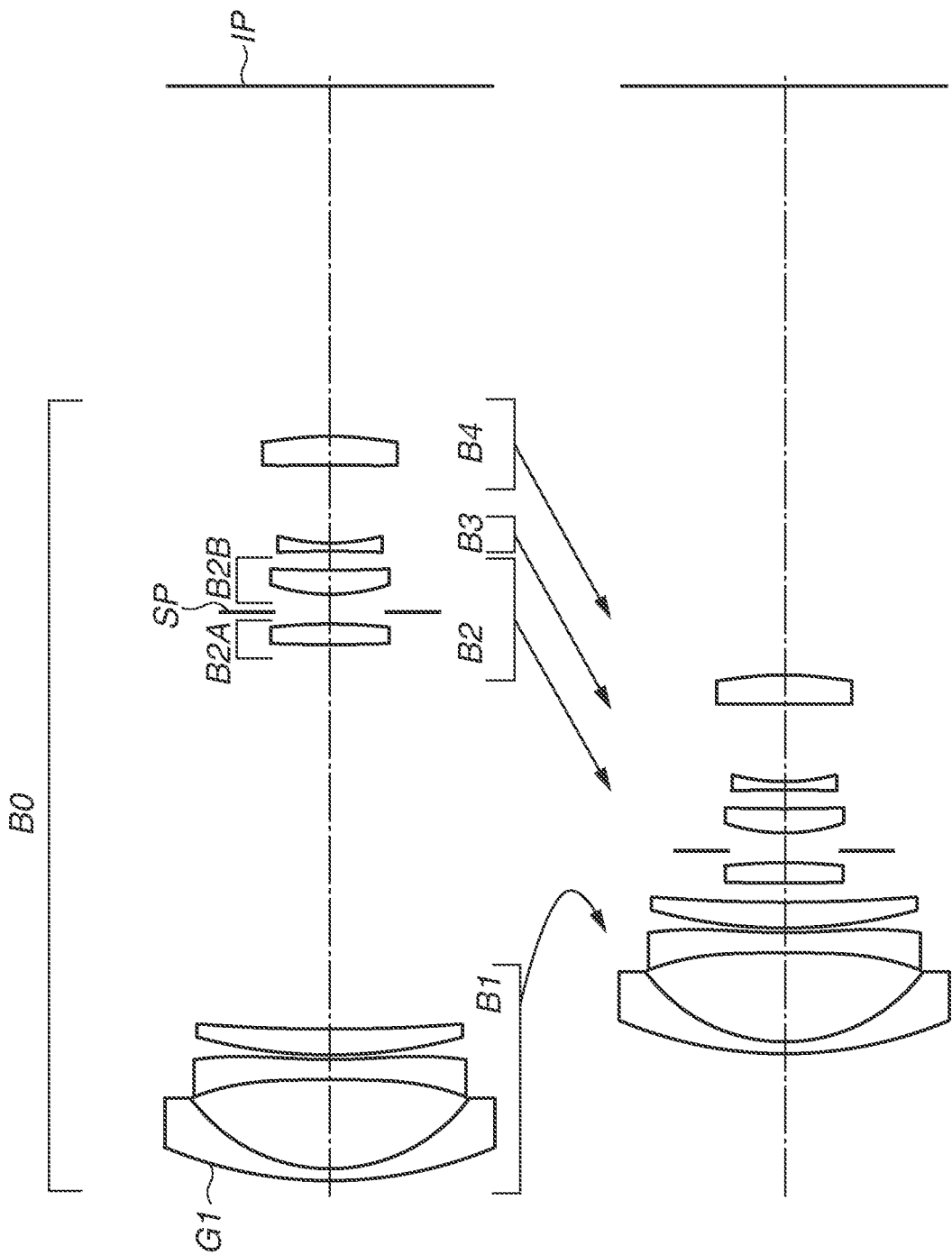

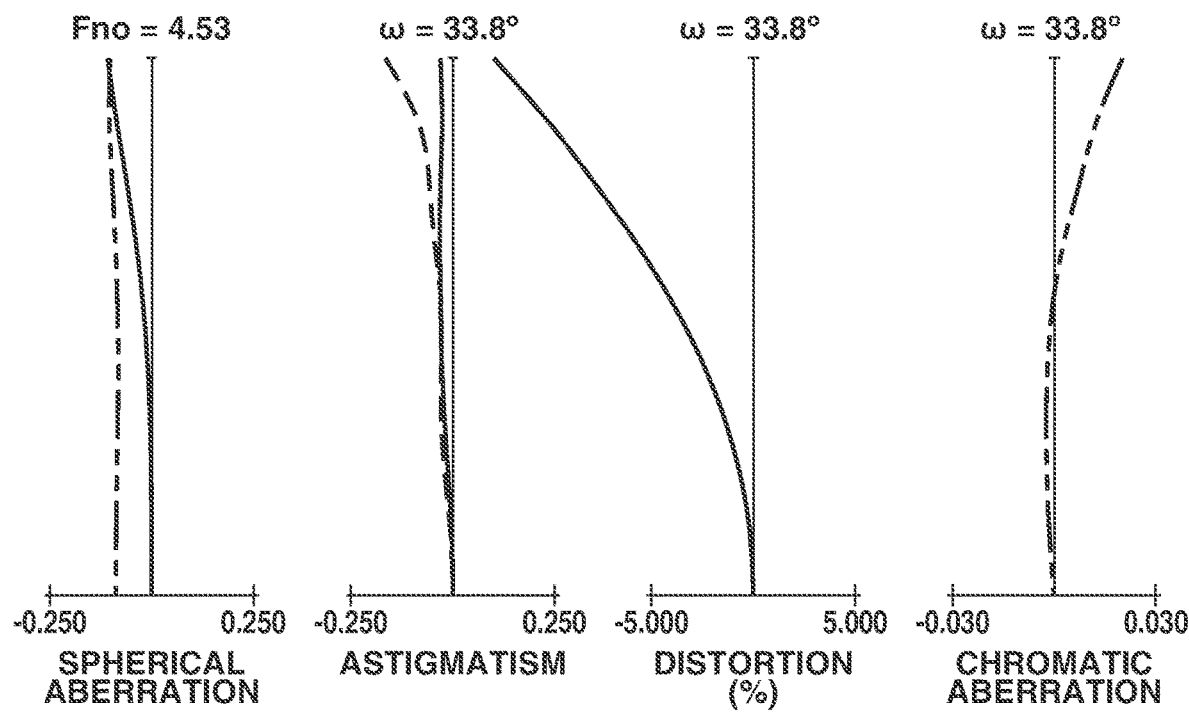
FIG.6A WIDE ANGLE END
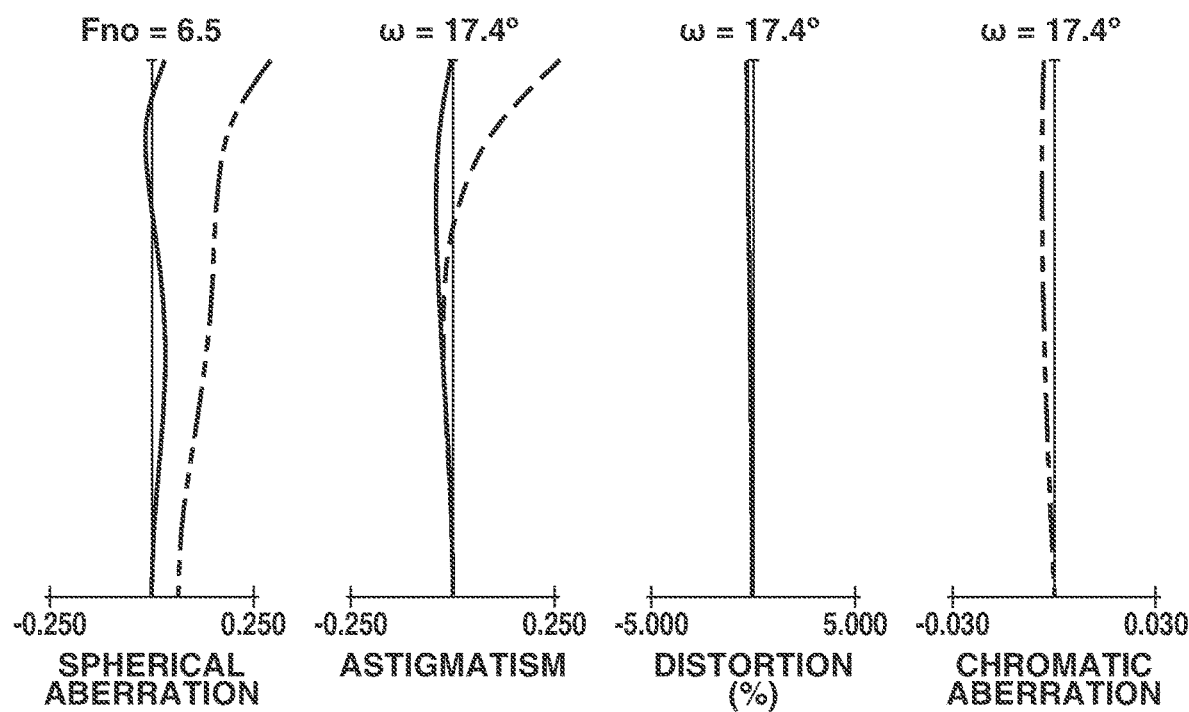
FIG.6B TELEPHOTO END

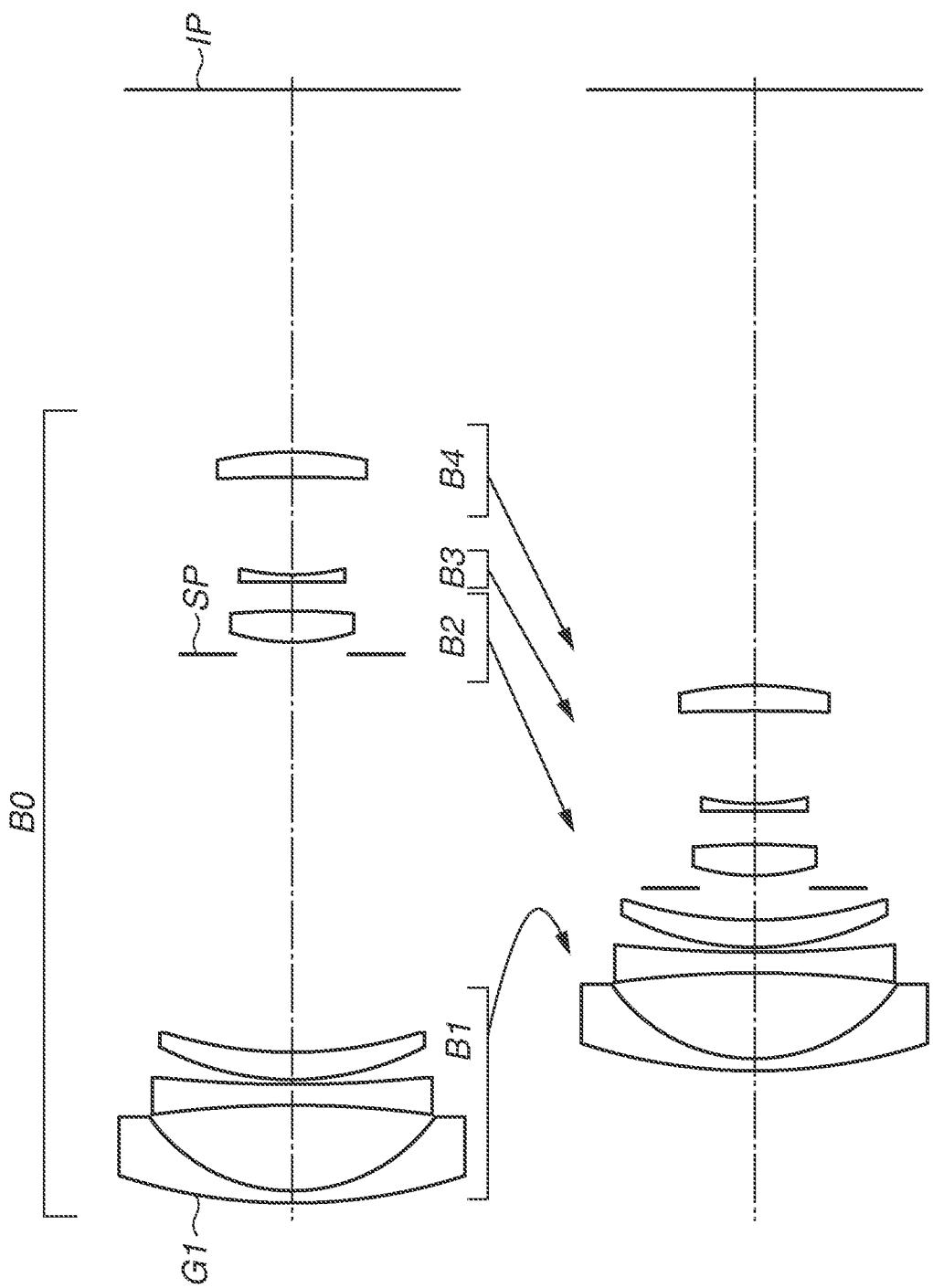
FIG.7A WIDE ANGLE END
FIG.7B TELEPHOTO END

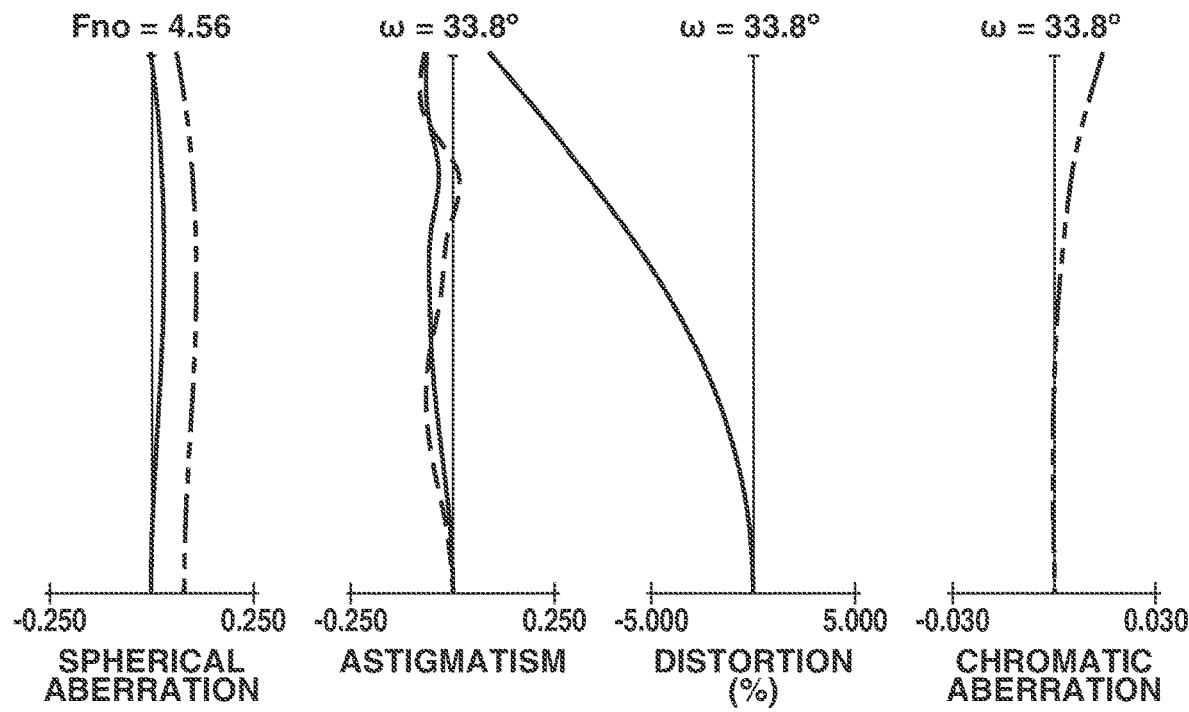
FIG.8A WIDE ANGLE END
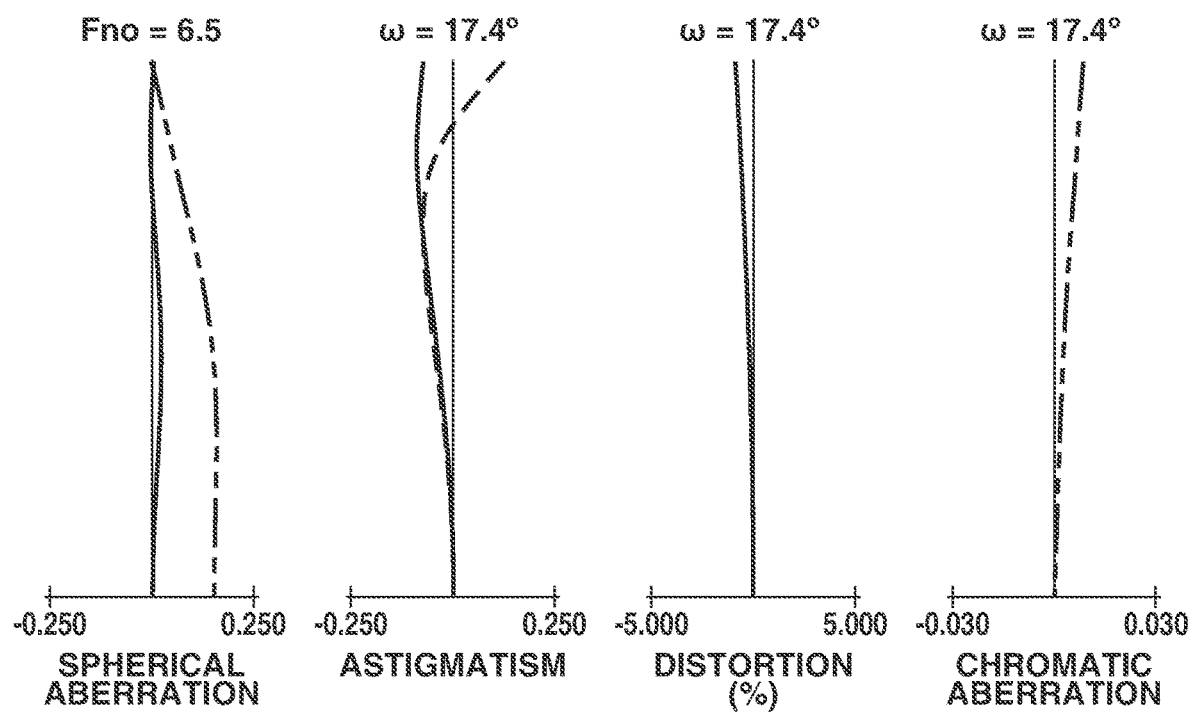
FIG.8B TELEPHOTO END

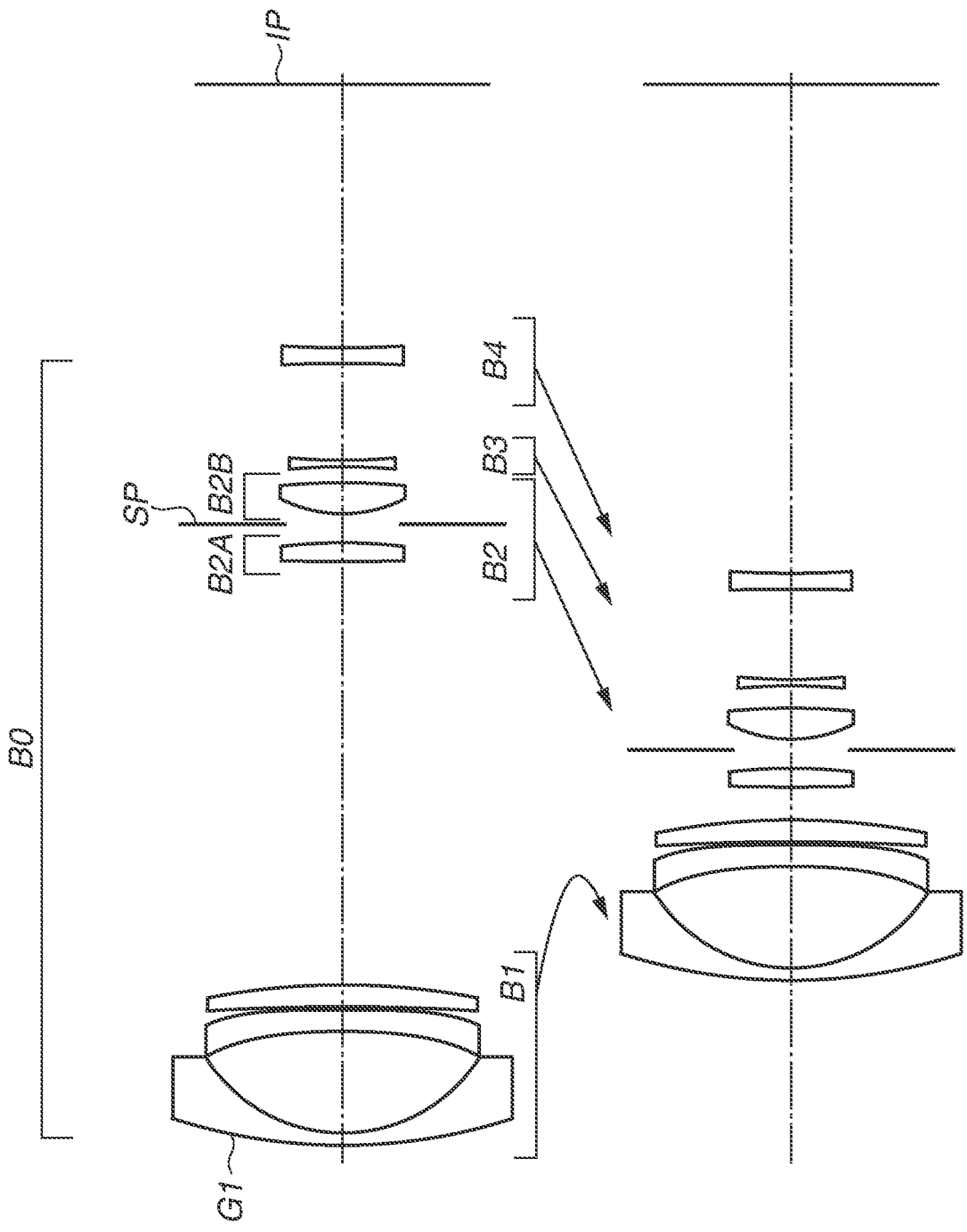

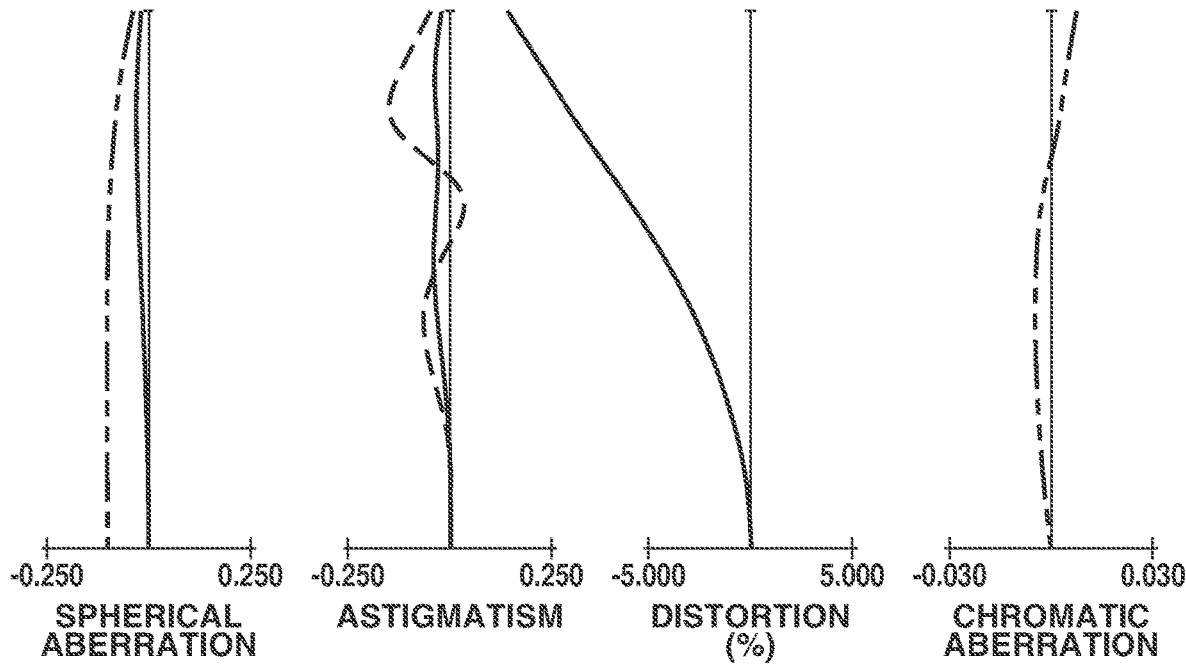
FIG.10A WIDE ANGLE END
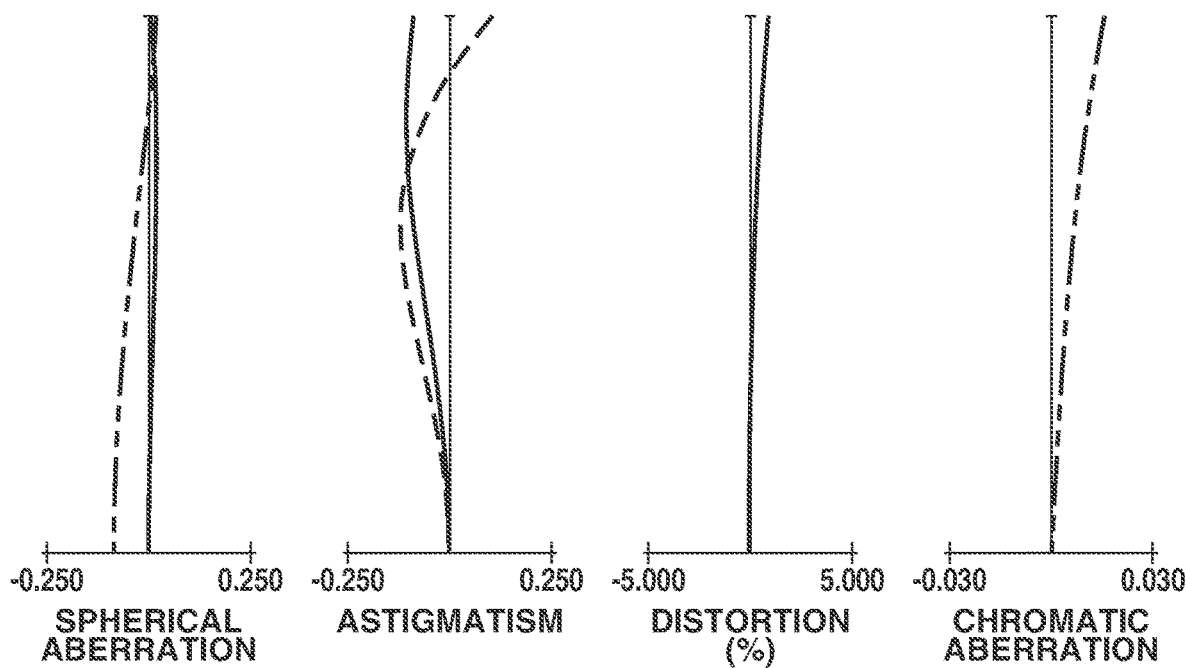
FIG.10B TELEPHOTO END

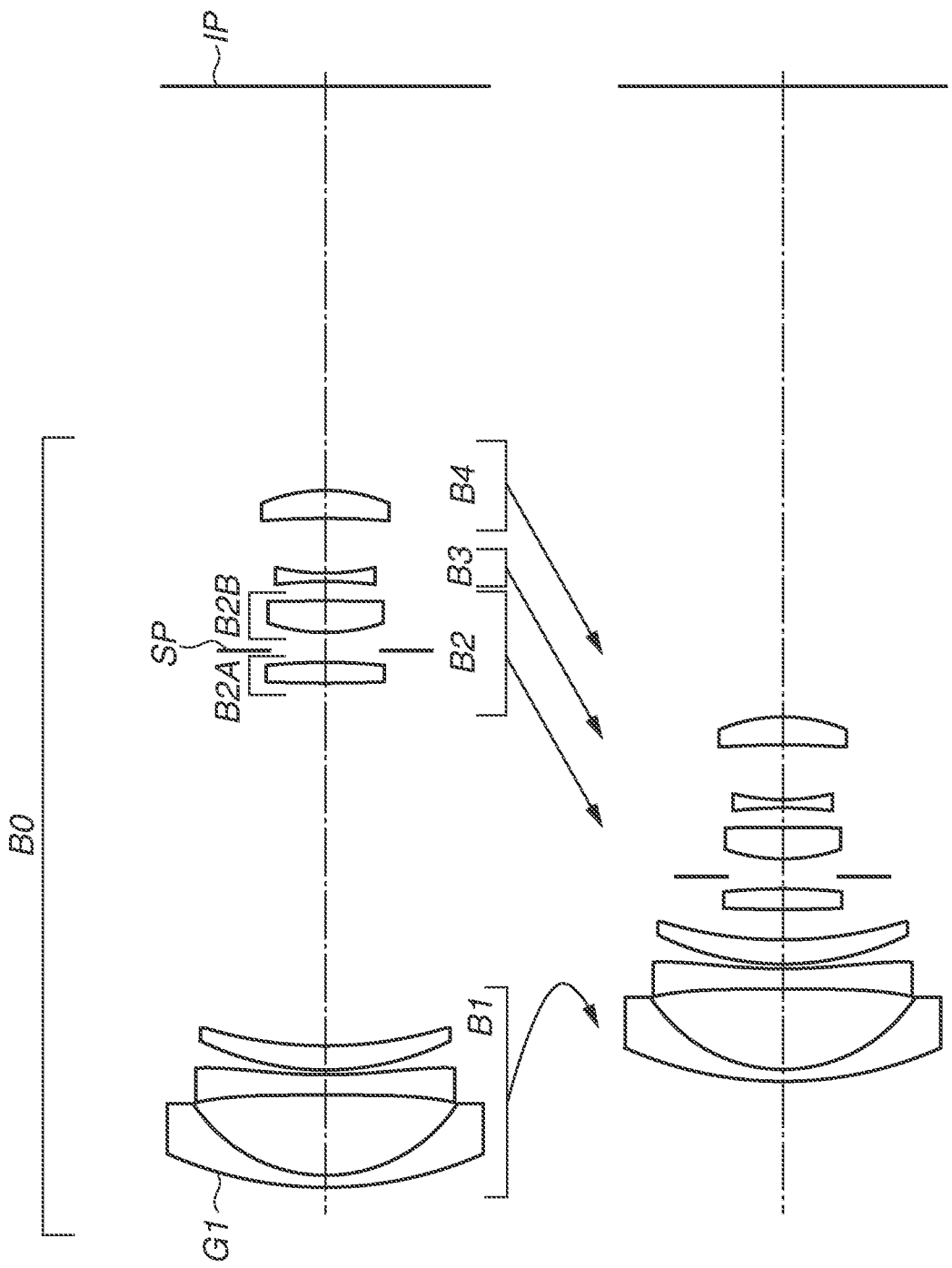

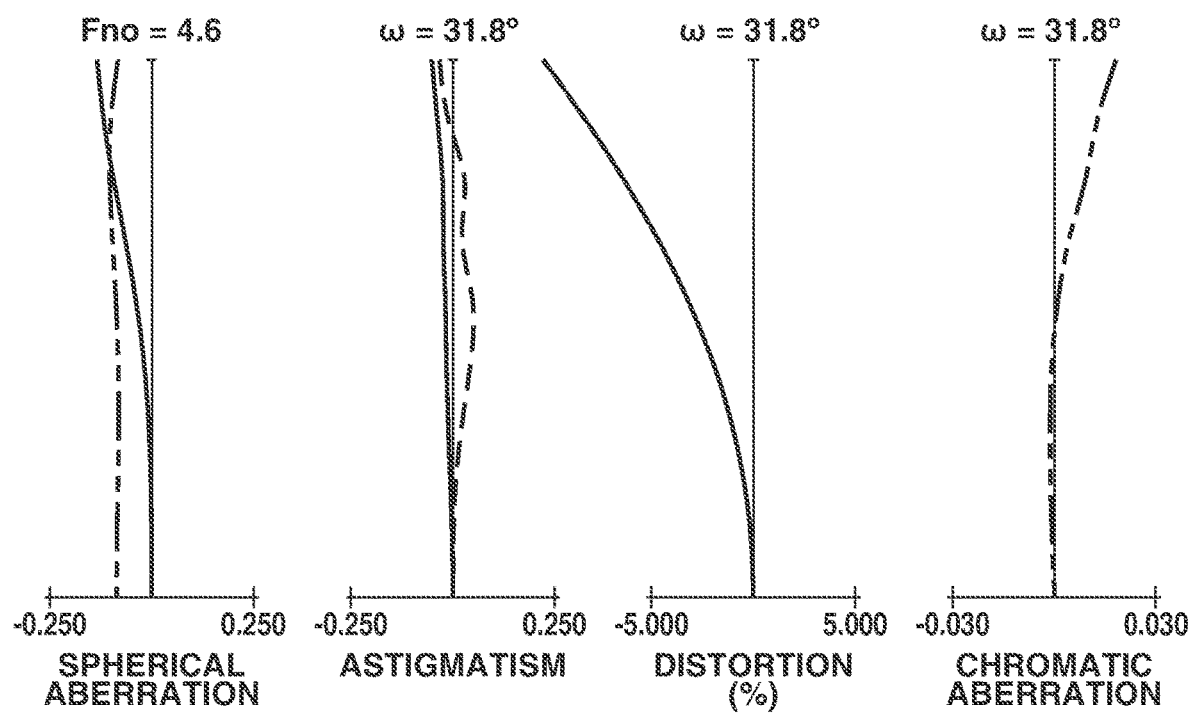
FIG.12A WIDE ANGLE END
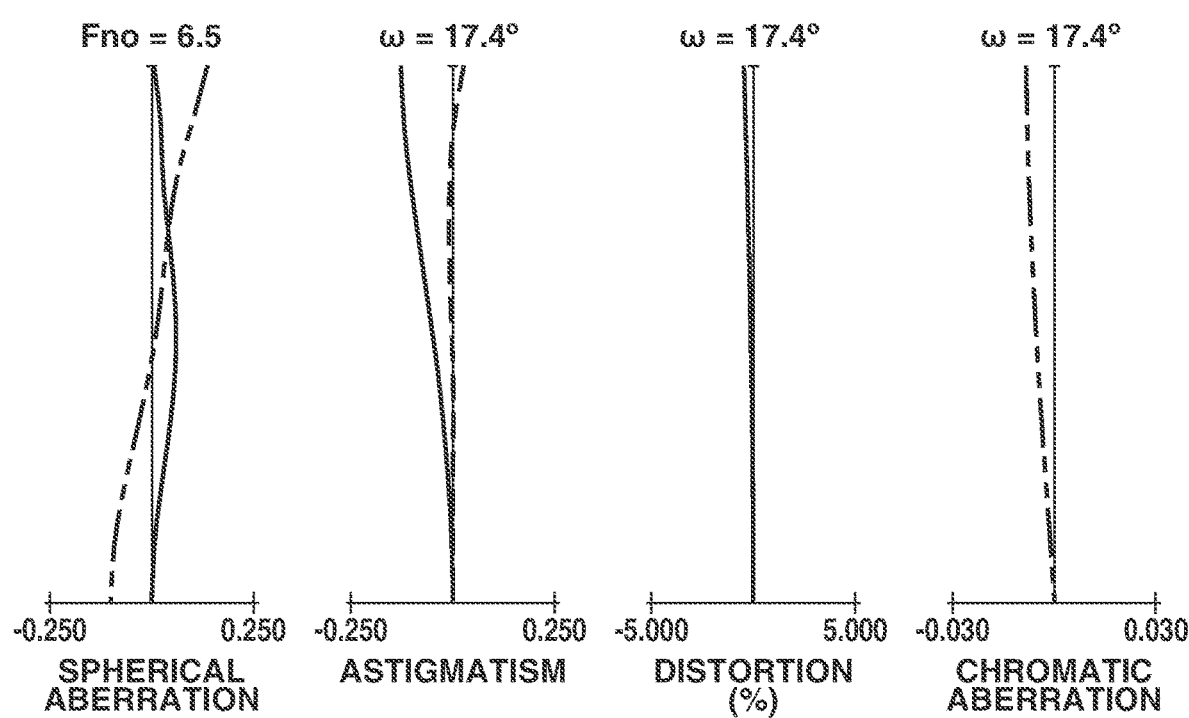
FIG.12B TELEPHOTO END

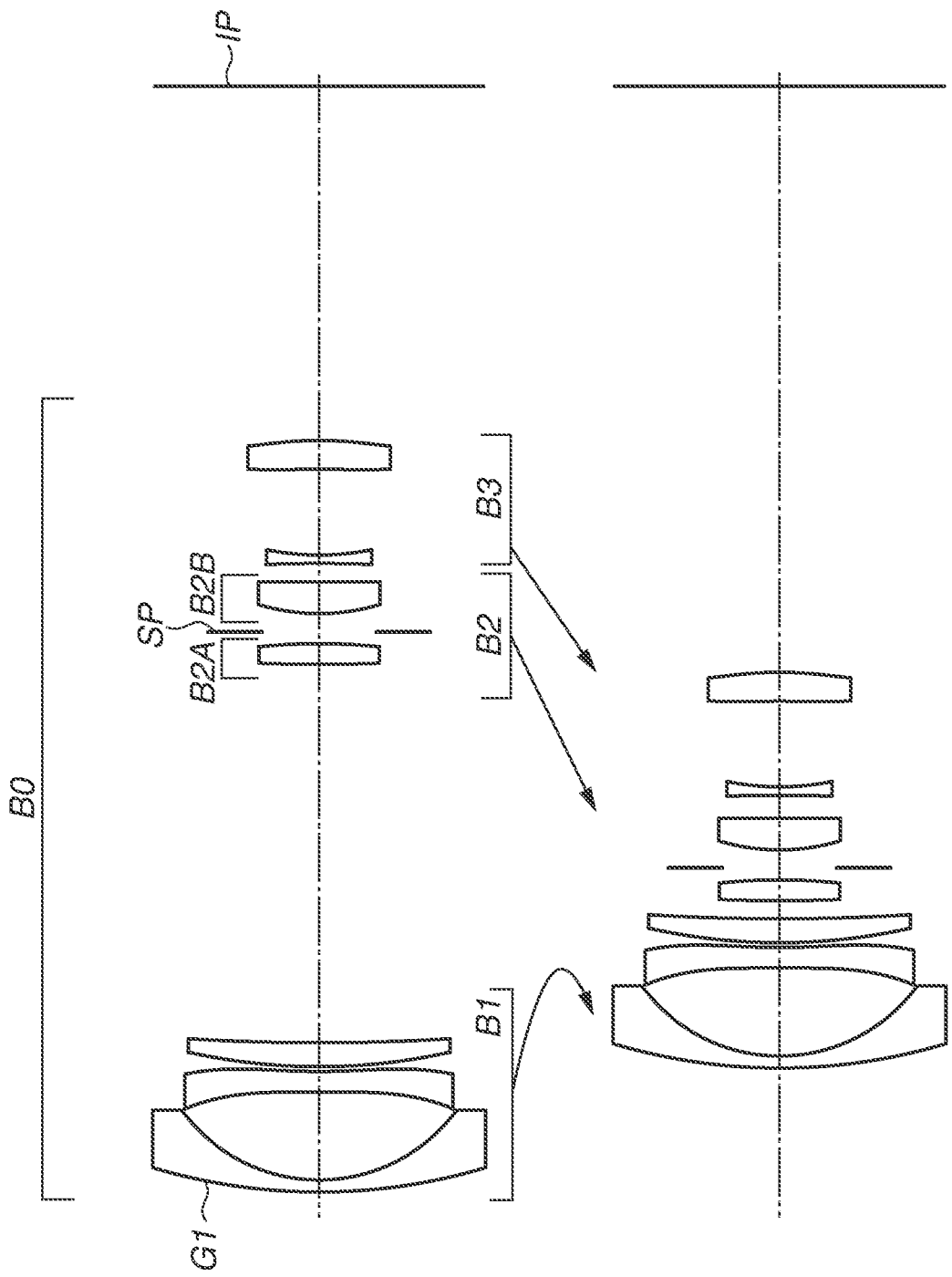

WIDE ANGLE END

TELEPHOTO END

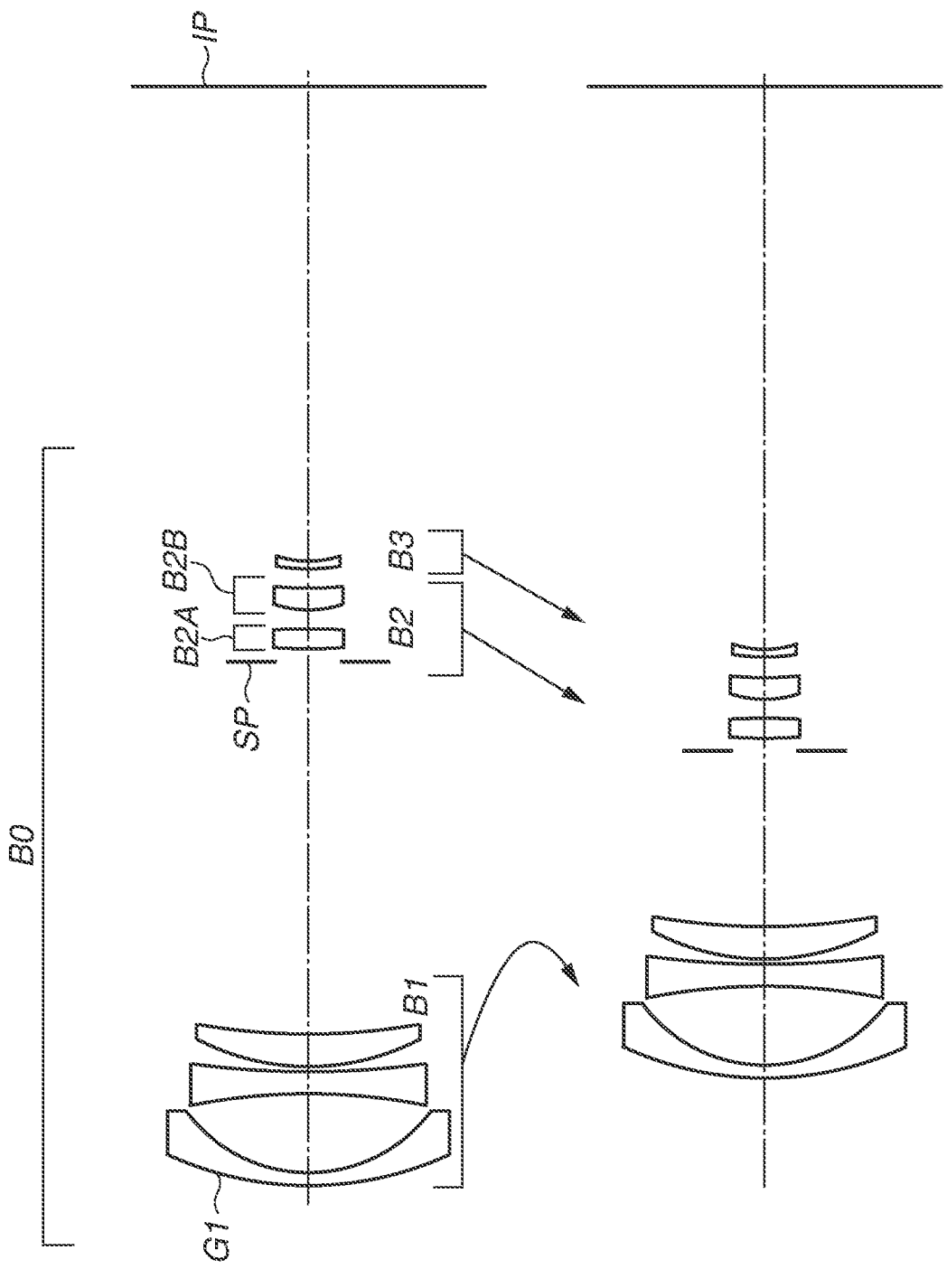

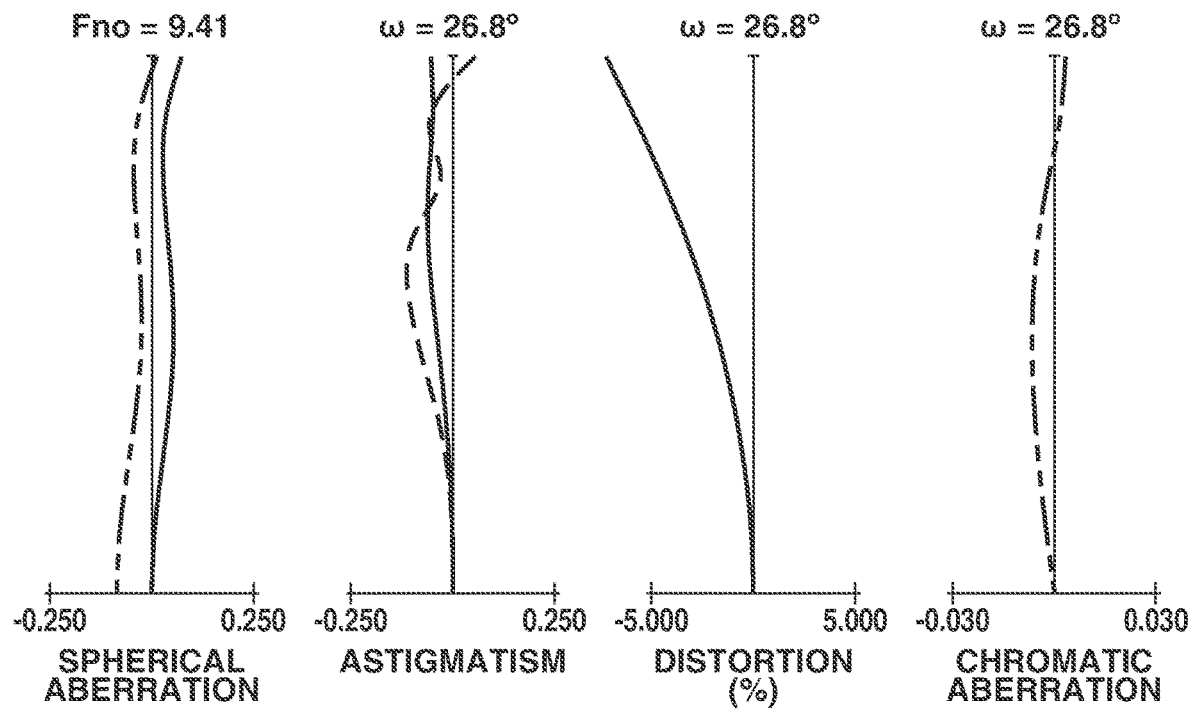
FIG.16A WIDE ANGLE END
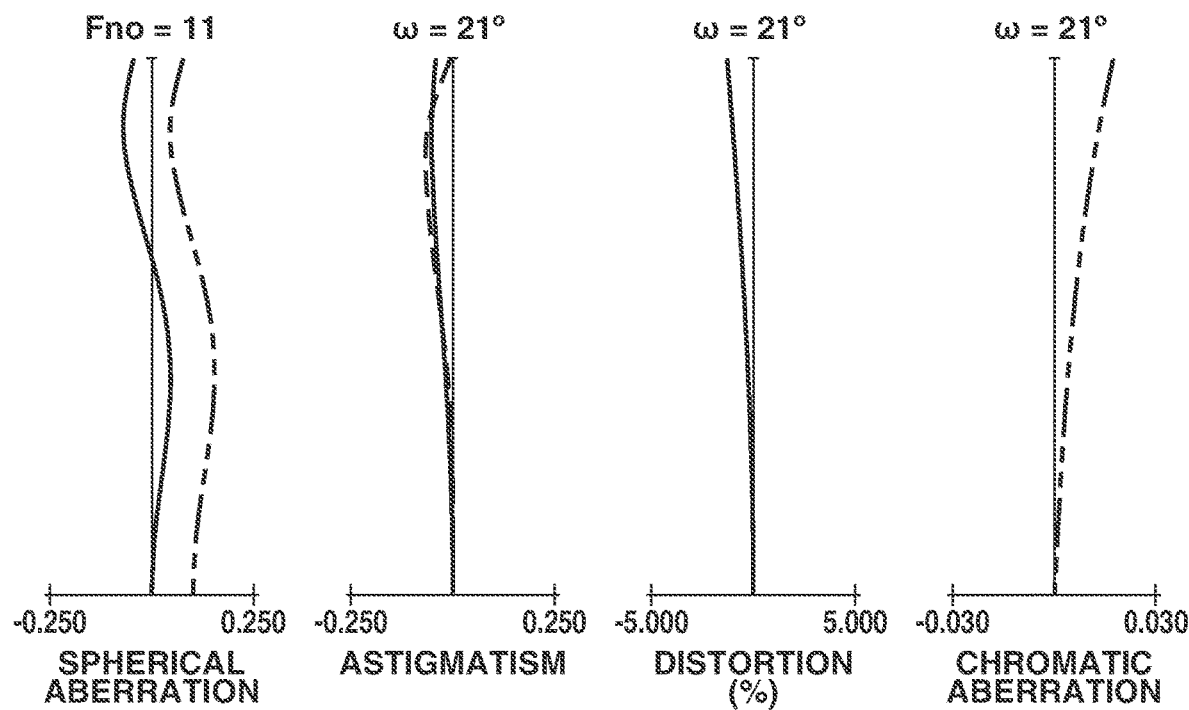
FIG.16B TELEPHOTO END

ZOOM LENS AND IMAGE CAPTURING APPARATUS INCLUDING THE SAME

BACKGROUND OF THE INVENTION

Field of the Invention

The aspect of the embodiments relates to a zoom lens suitable for image capturing apparatus, such as a digital video camera, a digital still camera, a camera for broadcast, a camera for silver-halide film, and a monitoring camera.

Description of the Related Art

As a zoom lens that is used for an image capturing apparatus, a negative-lead zoom lens in which a lens unit having negative refractive power is disposed at a position closest to the object has been known.

Japanese Patent Laid-Open No. 2014-178388 discusses a negative-lead zoom lens including a first lens unit having negative refractive power, a second lens unit having positive refractive power, and a subsequent lens unit.

To enhance optical performance while weight reduction of a zoom lens is achieved, it is important to appropriately specify the number of lens units included in the zoom lens and the refractive power in agreement with each other.

In the zoom lens discussed in Japanese Patent Laid-Open No. 2014-178388, enhanced performance and weight reduction of the zoom lens are balanced insufficiently.

SUMMARY OF THE INVENTION

According to one aspect of the embodiments, there is provided a zoom lens including a first lens unit having negative refractive power, a second lens unit having positive refractive power, and a third lens unit having negative refractive power in order from an object side to an image side, wherein a distance between the first lens unit and the second lens unit and a distance between the second lens unit and the third lens unit change during at least one of zooming and focusing, wherein the first lens unit moves during zooming, wherein the first lens unit includes a negative lens G1 disposed closest to the object side and at least one positive lens, wherein lenses included in the second lens unit all have positive refractive power, wherein a number of lenses included in the third lens unit is two or less, wherein the third lens unit moves toward the image side during focusing from infinity to close range, and wherein the following inequality is satisfied:

$$1.40 < Nd\_G1 < 1.80$$

where $Nd\_G1$ is a refractive index of the negative lens G1.

Further features of the disclosure will become apparent from the following description of exemplary embodiments with reference to the attached drawings.

BRIEF DESCRIPTION OF THE DRAWINGS

FIGS. 1A and 1B are cross-sectional views of a zoom lens according to a first exemplary embodiment.

FIGS. 3A and 3B are cross-sectional views of a zoom lens according to a second exemplary embodiment.

FIGS. 4A and 4B are aberration diagrams of the zoom lens according to the second exemplary embodiment.

FIGS. 5A and 5B are cross-sectional views of a zoom lens according to a third exemplary embodiment.

FIGS. 6A and 6B are aberration diagrams of the zoom lens according to the third exemplary embodiment.

FIGS. 7A and 7B are cross-sectional views of a zoom lens according to a fourth exemplary embodiment.

FIGS. 8A and 8B are aberration diagrams of the zoom lens according to the fourth exemplary embodiment.

FIGS. 9A and 9B are cross-sectional views of a zoom lens according to a fifth exemplary embodiment.

FIGS. 10A and 10B are aberration diagrams of the zoom lens according to the fifth exemplary embodiment.

FIGS. 11A and 11B are cross-sectional views of a zoom lens according to a sixth exemplary embodiment.

FIGS. 12A and 12B are aberration diagrams of the zoom lens according to the sixth exemplary embodiment.

FIGS. 13A and 13B are cross-sectional views of a zoom lens according to a seventh exemplary embodiment.

FIGS. 15A and 15B are cross-sectional views of a zoom lens according to an eighth exemplary embodiment.

FIGS. 16A and 16B are aberration diagrams of the zoom lens according to the eighth exemplary embodiment.

DESCRIPTION OF THE EMBODIMENTS

Figure 2A:
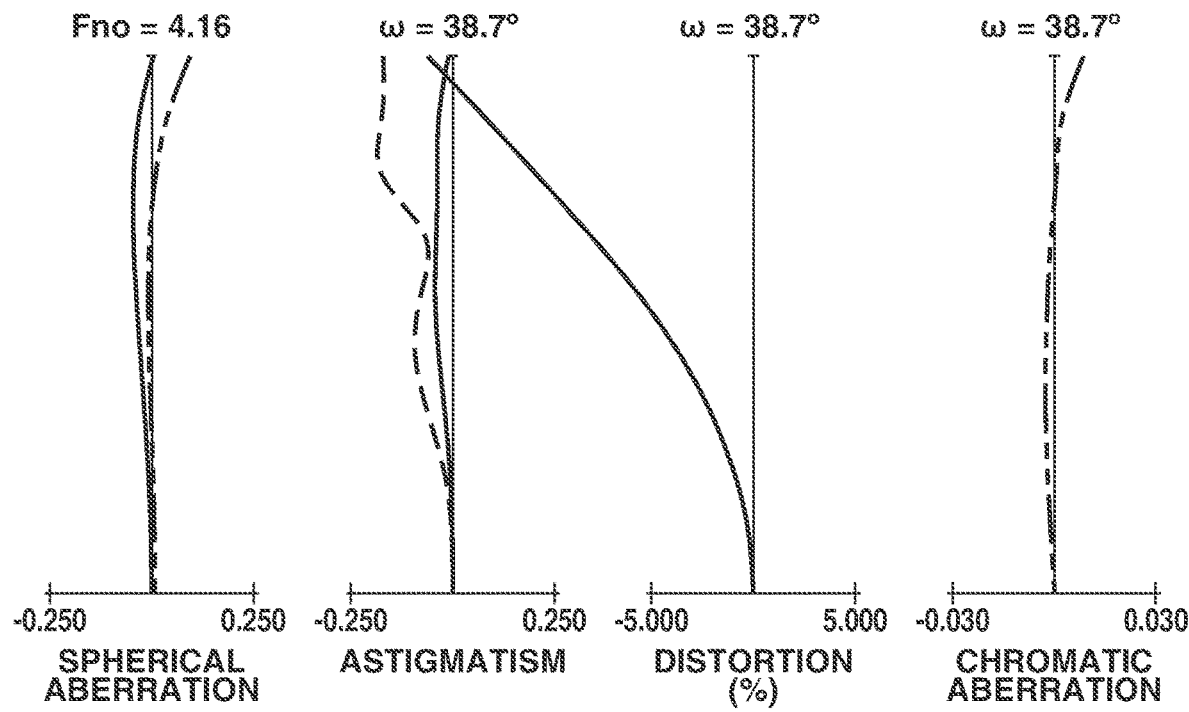
FIGS. 2A and 2B are aberration diagrams of the zoom lens according to the first exemplary embodiment.
Figure 2B:
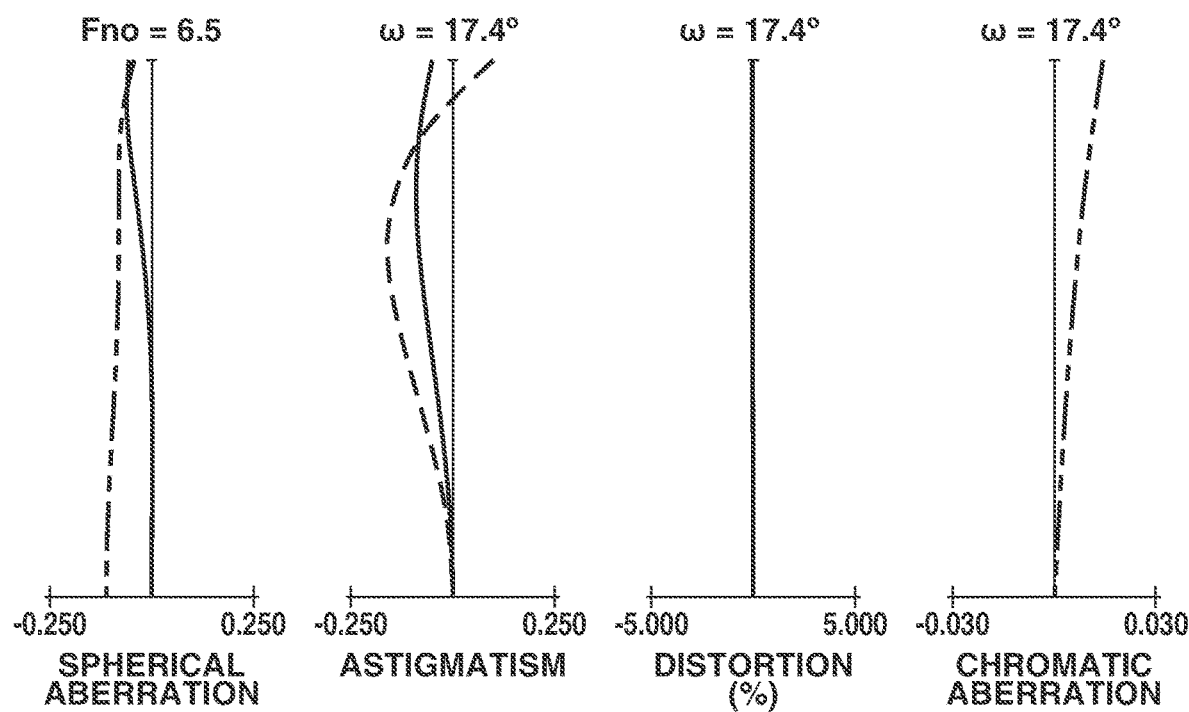
Figure 14A:
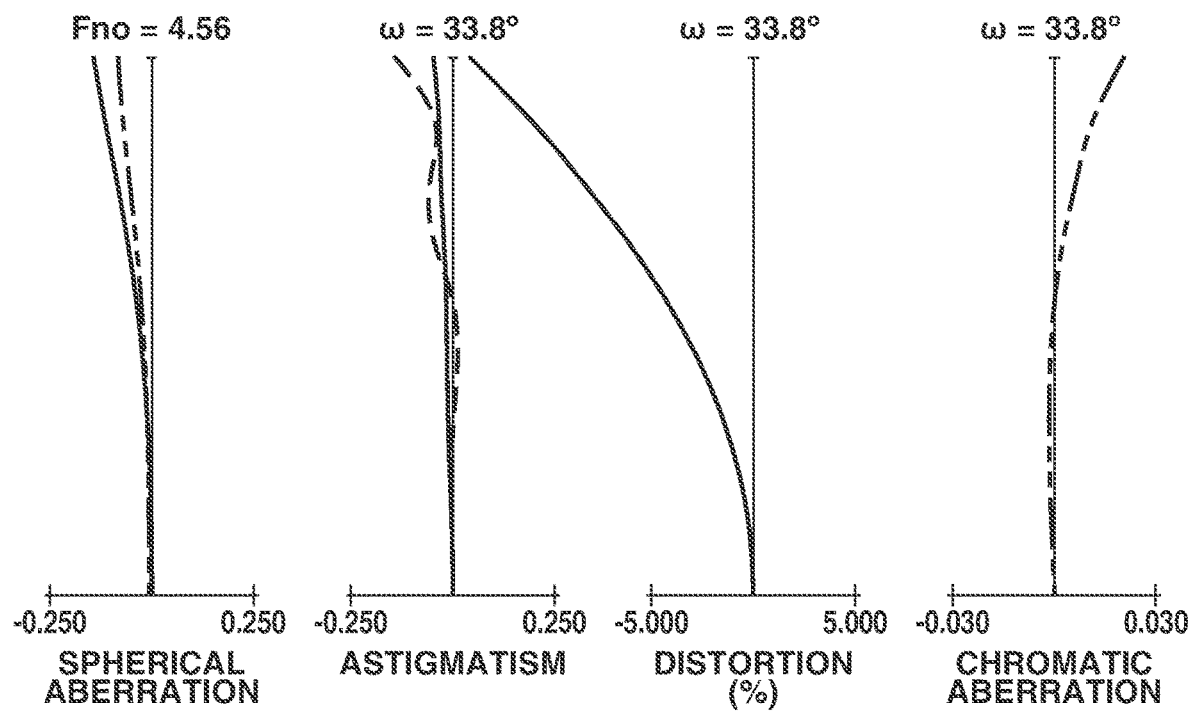
FIGS. 14A and 14B are aberration diagrams of the zoom lens according to the seventh exemplary embodiment.
Figure 14B:
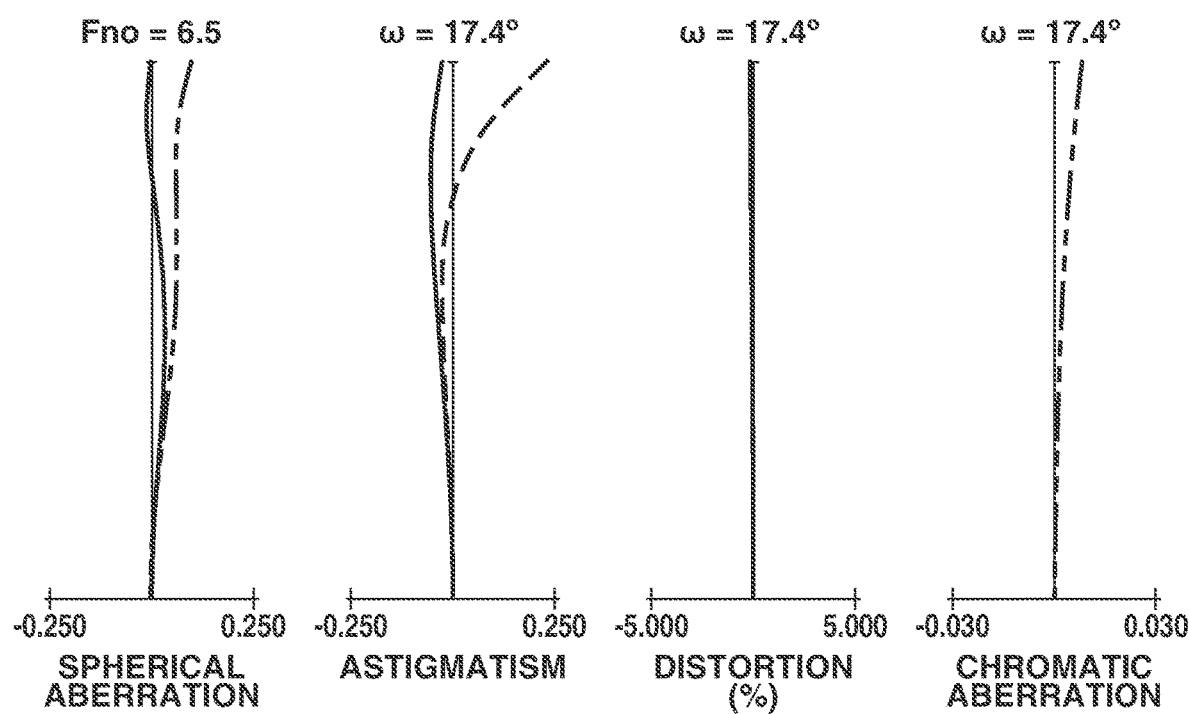

A zoom lens and an image capturing apparatus including the same according to exemplary embodiments of the disclosure will be described below with reference to the attached drawings.

FIGS. 1A and 1B, FIGS. 3A and 3B, FIGS. 5A and 5B, FIGS. 7A and 7B, FIGS. 9A and 9B, FIGS. 11A and 11B, FIGS. 13A and 13B, and FIGS. 15A and 15B are cross-sectional views of zoom lenses B0 of first, second, third, fourth, fifth, sixth, seventh, and eighth exemplary embodiments according to the disclosure, respectively. FIG. 1A, FIG. 3A, FIG. 5A, FIG. 7A, FIG. 9A, FIG. 11A, FIG. 13A, and FIG. 15A are cross-sectional views at a wide angle end, and FIG. 1B, FIG. 3B, FIG. 5B, FIG. 7B, FIG. 9B, FIG. 11B, FIG. 13B, and FIG. 15B are cross-sectional views at a telephoto end.

The zoom lens B0 according to each of the exemplary embodiments is used for image capturing apparatuses, such as a digital still camera, a video camera, a silver-halide film camera, a camera for broadcast, and a projection apparatus, such as a projector. In each of the lens cross-sectional views, the left side is the object side (the enlargement side) and the right side is the image side (the reduction side).

In each of the lens cross-sectional views, "Bi" ("i" is a natural number) represents the "ith lens unit" where lens units included in the zoom lens B0 are counted in order from the object side to the image side. The lens unit in the present disclosure is a component of the zoom lens B0 and includes one or a plurality of lenses. The lenses in each of the lens units integrally move or remain in place during at least one of zooming and focusing, and the distance between the lens units adjacent to each other changes during at least one of zooming and focusing. In a case where optical members (such as a prism, a cover glass, and a filter) having substantially no refractive power are disposed at a position closest to the image or at a position closest to the object in the zoom lens B0, the optical members are not described as a part of the zoom lens.

An aperture stop SP determines (limits) the amount of light at a full aperture of F-number (Fno). An imaging plane IP is an image place where an image sensor (a photoelectric conversion element), such as a charge coupled device (CCD) sensor and a complementary metal oxide semiconductor (CMOS) sensor, is disposed in a case where the zoom lens B0 according to each of the exemplary embodiments is used as an image-capturing optical system of a video camera or a digital still camera. In a case where the zoom lens B0 according to each of the exemplary embodiments is used as an image-capturing optical system of a silver-halide camera, the photosensitive surface of a film is disposed at the imaging plane IP.

Arrows illustrated in each of the lens cross-sectional views each represent a simplified movement locus of each of the lens units in zooming from the wide angle end to the telephoto end. Each of the wide angle end and the telephoto end in the present disclosure refers to a zoom position of a state where each of the lens units is at an end of a corresponding mechanically movable range.

The zoom lens B0 according to each of the exemplary embodiments includes a first lens unit B1 having negative refractive power, a second lens unit B2 having positive refractive power, and a third lens unit B3 having negative refractive power, in order from the object side to the image side. Effects of the disclosure can also be effectively achieved even in a case where the zoom lens B0 further includes another lens unit on the image side of the third lens unit B3.

In the zoom lens B0 according to each of the exemplary embodiments, the first lens unit B1 moves during zooming. The first lens unit B1 includes a negative lens G1 at a position closest to the object and at least one positive lens.

In the zoom lens B0 according to each of the exemplary embodiments, lenses included in the second lens unit B2 all have positive refractive power. In other words, the second lens unit B2 consists only one or more positive lenses.

In the zoom lens B0 according to each of the exemplary embodiments, the number of lenses included in the third lens unit B3 is two or less, and the third lens unit B3 moves toward the image side during focusing from infinity to close range.

The zoom lens B0 according to each of the exemplary embodiments may have a function as an anti-vibration optical system by decentering one or a plurality of lenses in a direction including a component perpendicular to an optical axis in image blurring correction. Further, a parallel plate substantially having no refractive power, for example, a low-pass filter and an infrared cut filter, may be disposed between the lens disposed closest to the object side and the imaging plane IP.

FIGS. 2A and 2B, FIGS. 4A and 4B, FIGS. 6A and 6B, FIGS. 8A and 8B, FIGS. 10A and 10B, FIGS. 12A and 12B, FIGS. 14A and 14B, and FIGS. 16A and 16B are aberration diagrams each illustrating the zoom lens B0, and correspond to the first, second, third, fourth, fifth, sixth, seventh, and eighth exemplary embodiments, respectively. FIG. 2A, FIG. 4A, FIG. 6A, FIG. 8A, FIG. 10A, FIG. 12A, FIG. 14A, and FIG. 16A each illustrate aberration in an infinity in-focus state at the wide angle end, whereas FIG. 2B, FIG. 4B, FIG. 6B, FIG. 8B, FIG. 10B, FIG. 12B, FIG. 14B, and FIG. 16B each illustrate aberration in an infinity in-focus state at the telephoto end.

In each of the aberration diagrams, "Fno" indicates an F-number, and "ω" indicates a half angle of view (degree) that is an angle of view determined by paraxial calculation.

A spherical aberration diagram illustrates a d-line (a wavelength of 587.6 nm) and a g-line (a wavelength of 435.8 nm).

A line S and a dotted line M in an astigmatism diagram represent the d-line at a sagittal image plane and the d-line at a meridional image plane, respectively. A distortion diagram illustrates the d-line. A chromatic aberration diagram illustrates a magnification chromatic aberration amount of the g-line with respect to the d-line.

A descriptions will be given of characteristics of the zoom lens B0 according to each of the exemplary embodiments.

The zoom lens B0 according to each of the exemplary embodiments is a negative-lead zoom lens. The third lens unit B3 which has negative refractive power and of which diameter is easily reducible is configured to move during focusing, and therefore it is possible to achieve weight reduction of not only a focus lens unit, but also a holding mechanism for holding the focus lens unit as well as a drive mechanism for driving the focus lens unit. The third lens unit B3 includes two lenses or less, and therefore the weight is further reduced.

In the zoom lens B0 according to each of the exemplary embodiments, the first lens unit B1 includes the negative lens G1 at a position closest to the object. This is because, in a negative-lead zoom lens, the diameter of a lens closest to the object can be reduced by using a negative lens as the lens closest to the object. The first lens unit B1 further includes at least one positive lens. The chromatic aberration of the first lens unit B1 is thereby successfully corrected. In particular, because the first lens unit B1 is the lens unit that moves during zooming, variations in magnification chromatic aberration and axial chromatic aberration that occur during zooming can be reduced by the above-describe configuration.

In the zoom lens B0 according to each of the exemplary embodiments, the second lens unit B2 consists only one or more positive lenses. The second lens unit B2 functions as a main magnifying unit in the zoom lens B0 according to each of the exemplary embodiments, and thus it is desirable to provide strong positive refractive power to the second lens unit B2. If a negative lens is added to the second lens unit B2, the refractive power of the positive lens in the second lens unit B2 is required to be increased as much as the negative refractive power of the added negative lens. This increases the thickness of the second lens unit B2, and consequently weight reduction of the zoom lens B0 is difficult to achieve.

The zoom lens B0 according to each of the exemplary embodiments satisfies the following inequality (1):

$$1.40 < Nd\_G1 < 1.80 \tag{1}$$

where, $Nd\_G1$ is a refractive index in the d-line of the negative lens G1.

The inequality (1) defines the refractive index of the negative lens G1. In a case where the refractive index exceeds the upper limit of the inequality (1), it is difficult to obtain a material having low specific gravity, i.e., a material beneficial to weight reduction of the zoom lens B0. Meanwhile, in a case where the refractive index falls below the lower limit of the inequality (1), the volume of the negative lens G1 increases when sufficient refractive power is provided to the negative lens G1, and consequently the weight reduction is difficult to achieve, which may not desirable. In addition, in the above-described case, the curvature radius of the negative lens G1 on the image plane side is too small, and consequently it is difficult to successfully reduce or suppress occurrence of the field curvature and the astigmatism at the wide angle end in particular.

By satisfying the above-described configuration, the optical system in each of the exemplary embodiments achieves excellent optical performance while being light in weight.

As for the numerical range of the above-described inequality (1), it is more desirable to satisfy the following inequality (1a):

$$1.43 < Nd\_G1 < 1.79 \tag{1a}$$

It is still more desirable for the numerical range of the above-described inequality (1) to satisfy the following inequality (1b):

$$1.45 < Nd\_G1 < 1.78 \tag{1b}$$

Next, a description will be given of a desirable condition which is satisfied in the zoom lens B0 according to each of the exemplary embodiments.

It is desirable for the zoom lens B0 according to each of the exemplary embodiments to satisfy one or more of the following inequalities (2) to (6):

$$5.0 < SF\_B3n < 0.50 \tag{2}$$

$$1.0 < |f1|/fw < 3.0 \tag{3}$$

$$0.2 < f2/fw < 5.0 \tag{4}$$

$$0.1 < f3/f1 < 5.0 \tag{5, and}$$

$$18 < vd\_B3n < 36 \tag{6}$$

SF_B3n is a shape factor SF of the negative lens having the strongest refractive power among the negative lenses included in the third lens unit B3 (in a case where the third lens unit B3 consists of one negative lens, the shape factor SF is for the one negative lens). The shape factor SF is an amount defined as:

$$SF = (R2 + R1)/(R2 - R1),$$

where R1 is the curvature radius of the lens surface on the image side, and R2 is the curvature radius of the lens surface on the object side.

Further, fw is a focal length of the zoom lens B0 at the wide angle end, f1 is a focal length of the first lens unit B1, f2 is a focal length of the second lens unit B2, f3 is a focal length of the third lens unit B3, and vd_B3n is an Abbe number in the d-line of the negative lens having the strongest refractive power among the negative lenses included in the third lens unit B3 (in a case where the third lens unit B3 consists of one negative lens, the Abbe number is for the one negative lens).

The inequality (2) defines the shape of the negative lens having the strongest refractive power among the negative lenses included in the third lens unit B3. In a case where the value falls below the lower limit of the inequality (2), it is difficult to successfully reduce or suppress a variation in the field curvature that occurs in focusing at the wide angle end, which may not desirable. In a case where the value exceeds the upper limit of the inequality (2), it is difficult to successfully reduce or suppress a variation in the spherical aberration that occurs in focusing at the telephoto end, which may not desirable.

The inequality (3) defines the ratio between the focal length of the first lens unit B1 and the entire system focal length at the wide angle end. In a case where the value falls below the lower limit of the inequality (3), the refractive power of the first lens unit B1 is too strong, and consequently it is difficult to successfully reduce or suppress the field curvature and the astigmatic difference occurring at the wide angle end. In a case where the value exceeds the upper limit of the inequality (3), the refractive power of the first lens unit B1 is too weak, and consequently the front diameter (the diameter of the lens closest to the object) is too large. As a result, it is difficult to sufficiently reduce the weight of the zoom lens B0.

The inequality (4) defines the ratio between the focal length of the second lens unit B2 and the entire system focal length at the wide angle end. In a case where the value falls below the lower limit of the inequality (4), the refractive power of the second lens unit B2 is too strong, and consequently it is difficult to successfully reduce or suppress variations in the spherical aberration and the comatic aberration occurring from the wide angle end to the telephoto end. In a case where the value exceeds the upper limit of the inequality (4), the refractive power of the second lens unit B2 is too weak, and consequently a movement amount of the second lens unit that is required for a desirable zoom ratio is too large. As a result, it is difficult to sufficiently reduce the weight of the zoom lens B0.

The inequality (5) defines the ratio between the focal length of the third lens unit B3 and the focal length of the first lens unit B1. In a case where the value exceeds the upper limit of the inequality (5), the refractive power of the third lens unit B3 is too weak, and consequently the movement amount during focusing increases. The increase in the movement amount enlarges the drive mechanism, and consequently it is difficult to sufficiently reduce the weight. In a case where the value falls below the lower limit of the inequality (5), the refractive power of the third lens unit B3 is too strong, and consequently it is difficult to reduce a change in the optical performance during focusing to a sufficiently small amount.

The inequality (6) defines the Abbe number of the negative lens having the strongest refractive power among the negative lenses included in the third lens unit B3. In a case where the Abbe number is large to the extent that the Abbe number exceeds the upper limit of the inequality (6), the correction of the chromatic aberration in the entire zoom lens B0 is insufficient, and consequently high optical performance is insufficiently achieved. In a case where the Abbe number is small to the extent that the Abbe number falls below the lower limit of the inequality (6), the correction of the chromatic aberration in the entire zoom lens B0 is excessive, and consequently high optical performance is insufficiently achieved.

It is more desirable for the numerical ranges of the above-described inequalities (2) to (6) to satisfy the ranges represented by the following inequalities (2a) to (6a), respectively:

$$-4.5 < SF\_B3n < 0.30 \tag{2a}$$

$$1.25 < |f1|/fw < 2.6 \tag{3a}$$

$$0.4 < f2/fw < 3.0 \tag{4a}$$

$$0.2 < f3/f1 < 3.5 \tag{5a, and}$$

$$19 < vd\_B3n < 34 \tag{6a}$$

It is still more desirable for the numerical ranges of the above-described inequalities (2) to (6) to satisfy the ranges represented by the following inequalities (2b) to (6b), respectively:

$$-4.0 < SF\_B3n < 0.10 \tag{2b}$$

$$1.5 < |f1|/fw < 2.2 \tag{3b}$$

$$0.5 < f2/fw < 2.0 \tag{4b}$$

$$0.3 < f3/f1 < 2.0 \quad (5b), \text{ and}$$

$$20 < vd\_B3n < 32 \quad (6b).$$

Next, a description will be given of a desirable configuration which is satisfied in the zoom lens B0.

It is desirable for the zoom lens B0 to be configured in such a manner that the number of the included lenses from the lens closest to the object in the second lens unit B2 to the lens closest to the image in the zoom lens B0 be five or less. This number of lenses includes the lens closest to the object in the second lens unit B2 and the lens closest to the image in the zoom lens B0. With this configuration, the weight reduction is easily achieved while the zoom lens B0 has desirable optical performance.

It is further desirable that the number of lenses included in the second lens unit B2 be two or less. This also facilitates weight reduction while the zoom lens B0 has desirable optical performance.

It is still further desirable that the third lens unit B3 to consist of a single lens having negative refractive power. This also facilitates weight reduction while the zoom lens B0 has desirable optical performance.

In addition, it is desirable for the first lens unit B1 to include a lens having an aspherical surface (an aspherical lens). Having the aspherical lens reduces or suppresses the field curvature and the astigmatic difference occurring at the wide angle end. Further, it is desirable that the aspherical lens included in the first lens unit B1 be a lens made of resin (a resin lens) because this facilitates the weight reduction.

Moreover, in the zoom lens B0 according to each of the exemplary embodiments, it is desirable to correct camera shake by displacing a part or the whole of the second lens unit B2 in a direction substantially perpendicular to the optical axis.

While, in the zoom lens B0 according to each of the first to eighth exemplary embodiments, the focus lens unit is one lens unit, a plurality of lens units may be used as a focus unit. Such a focusing system is called floating.

Not only a refractive optical element (a lens) but also a diffractive optical element may also be used. Further, an optical path may be bent using a reflection optical member.

Next, a description in detail will be given of the zoom lens B0 according to each of the exemplary embodiments.

First Exemplary Embodiment

As illustrated in FIGS. 1A and 1B, the zoom lens B0 according to the first exemplary embodiment includes the first lens unit B1 having negative refractive power, the second lens unit B2 having positive refractive power, the third lens unit B3 having negative refractive power, and a fourth lens unit B4 having positive refractive power.

During zooming from the wide angle end to the telephoto end, the first lens unit B1 moves toward the image side, and the second lens unit B2 to the fourth lens unit B4 move toward the object side. In this operation, the distance between the first lens unit B1 and the second lens unit B2 decreases, the distance between the second lens unit B2 and the third lens unit B3 increases, and the distance between the third lens unit B3 and the fourth lens unit B4 decreases. The second lens unit B2 and the fourth lens unit B4 move in the identical loci during zooming.

The third lens unit B3 is the focus lens unit, and moves from the object side toward the image side during focusing from an infinity object to a close object. Image blurring (an image position) is corrected by moving the part of the second lens unit B2 (the fourth lens, a sub-unit B2A) on the object side in a direction including a component substantially perpendicular to the optical axis.

Second Exemplary Embodiment

As illustrated in FIGS. 3A and 3B, the zoom lens B0 according to the second exemplary embodiment includes the first lens unit B1 having negative refractive power, the second lens unit B2 having positive refractive power, the third lens unit B3 having negative refractive power, and the fourth lens unit B4 having positive refractive power.

During zooming from the wide angle end to the telephoto end, the first lens unit B1 moves toward the image side, and the second lens unit B2 to the fourth lens unit B4 move toward the object side. In this operation, the distance between the first lens unit B1 and the second lens unit B2 decreases, the distance between the second lens unit B2 and the third lens unit B3 increases, and the distance between the third lens unit B3 and the fourth lens unit B4 decreases. The second lens unit B2 and the fourth lens unit B4 move in the identical loci during zooming.

The third lens unit B3 is the focus lens unit, and moves from the object side toward the image side during focusing from the infinity object to the close object. Image blurring (the image position) is corrected by moving the part of the second lens unit B2 (the fourth lens, the sub-unit B2A) on the object side in a direction including a component substantially perpendicular to the optical axis.

Third Exemplary Embodiment

As illustrated in FIGS. 5A and 5B, the zoom lens B0 according to the third exemplary embodiment includes the first lens unit B1 having negative refractive power, the second lens unit B2 having positive refractive power, the third lens unit B3 having negative refractive power, and the fourth lens unit B4 having positive refractive power.

During zooming from the wide angle end to the telephoto end, the first lens unit B1 moves toward the image side, and the second lens unit B2, the third lens unit B3, and the fourth lens unit B4 move in the identical loci toward the object side. In this operation, the distance between the first lens unit B1 and the second lens unit B2 decreases.

The third lens unit B3 is the focus lens unit, and moves from the object side toward the image side during focusing from the infinity object to the close object. Image blurring (the image position) is corrected by moving the part of the second lens unit B2 (the fourth lens, the sub-unit B2A) on the object side in a direction including a component substantially perpendicular to the optical axis.

Fourth Exemplary Embodiment

As illustrated in FIGS. 7A and 7B, the zoom lens B0 according to the fourth exemplary embodiment includes the first lens unit B1 having negative refractive power, the second lens unit B2 having positive refractive power, the third lens unit B3 having negative refractive power, and the fourth lens unit B4 having positive refractive power.

During zooming from the wide angle end to the telephoto end, the first lens unit B1 moves toward the image side, and the second lens unit B2 to the fourth lens unit B4 move toward the object side. In this operation, the distance between the first lens unit B1 and the second lens unit B2 decreases, the distance between the second lens unit B2 and the third lens unit B3 increases, and the distance between the third lens unit B3 and the fourth lens unit B4 decreases. The second lens unit B2 and the fourth lens unit B4 move in the identical loci during zooming.

The third lens unit B3 is the focus lens unit and moves from the object side toward the image side during focusing from the infinity object to the close object. Image blurring (the image position) is corrected by moving the second lens unit B2 in a direction including a component substantially perpendicular to the optical axis.

Fifth Exemplary Embodiment

As illustrated in FIGS. 9A and 9B, the zoom lens B0 according to the fifth exemplary embodiment includes the first lens unit B1 having negative refractive power, the second lens unit B2 having positive refractive power, the third lens unit B3 having negative refractive power, and the fourth lens unit B4 having negative refractive power.

During zooming from the wide angle end to the telephoto end, the first lens unit B1 moves toward the image side, and the second lens unit B2 to the fourth lens unit B4 move toward the object side. In this operation, the distance between the first lens unit B1 and the second lens unit B2 decreases, the distance between the second lens unit B2 and the third lens unit B3 increases, and the distance between the third lens unit B3 and the fourth lens unit B4 decreases. The second lens unit B2 and the fourth lens unit B4 move in the identical loci during zooming.

The third lens unit B3 is the focus lens unit, and moves from the object side toward the image side during focusing from the infinity object to the close object. Image blurring (the image position) is corrected by moving the part of the second lens unit B2 (the fourth lens, the sub-unit B2A) on the object side in a direction including a component substantially perpendicular to the optical axis.

Sixth Exemplary Embodiment

As illustrated in FIGS. 11A and 11B, the zoom lens B0 according to the sixth exemplary embodiment includes the first lens unit B1 having negative refractive power, the second lens unit B2 having positive refractive power, the third lens unit B3 having negative refractive power, and the fourth lens unit B4 having positive refractive power.

During zooming from the wide angle end to the telephoto end, the first lens unit B1 moves toward the image side, and the second lens unit B2, the third lens unit B3, and the fourth lens unit B4 move in the identical loci toward the object side. In this operation, the distance between the first lens unit B1 and the second lens unit B2 decreases.

The third lens unit B3 is the focus lens unit, and moves from the object side toward the image side during focusing from the infinity object to the close object. Image blurring (the image position) is corrected by moving the part of the second lens unit B2 (the fourth lens, the sub-unit B2A) on the object side in a direction including a component substantially perpendicular to the optical axis.

Seventh Exemplary Embodiment

As illustrated in FIGS. 13A and 13B, the zoom lens B0 according to the seventh exemplary embodiment includes the first lens unit B1 having negative refractive power, the second lens unit B2 having positive refractive power, and the third lens unit B3 having negative refractive power.

During zooming from the wide angle end to the telephoto end, the first lens unit B1 moves toward the image side, the second lens unit B2 moves toward the object side, and the third lens unit B3 moves toward the object side. In this operation, the distance between the first lens unit B1 and the second lens unit B2 decreases, and the distance between the second lens unit B2 and the third lens unit B3 increases.

The third lens unit B3 is the focus lens unit, and moves from the object side toward the image side during focusing from the infinity object to the close object. Image blurring (the image position) is corrected by moving the part of the second lens unit B2 (the fourth lens, the sub-unit B2A) on the object side in a direction including a component substantially perpendicular to the optical axis.

Eighth Exemplary Embodiment

As illustrated in FIGS. 15A and 15B, the zoom lens B0 according to the eighth exemplary embodiment includes the first lens unit B1 having negative refractive power, the second lens unit B2 having positive refractive power, and the third lens unit B3 having negative refractive power.

During zooming from the wide angle end to the telephoto end, the first lens unit B1 moves toward the image side, the second lens unit B2 moves toward the object side, and the third lens unit B3 moves toward the object side. In this operation, the distance between the first lens unit B1 and the second lens unit B2 decreases, and the distance between the second lens unit B2 and the third lens unit B3 increases.

The third lens unit B3 is the focus lens unit, and moves from the object side toward the image side during focusing from the infinity object to the close object. Image blurring (the image position) is corrected by moving the part of the second lens unit B2 (the fourth lens, the sub-unit B2A) on the object side in a direction including a component substantially perpendicular to the optical axis.

Next, first to eighth numeric examples corresponding to the first to eighth exemplary embodiments, respectively, will be described.

In surface data of each of the first to eighth numeric examples, r represents the curvature radius of each optical surface, and d (mm) represents the axial distance (the distance in the optical axis) between an mth surface and an (m+1)th surface, where m is a number assigned to each surface and numbered from the light incidence side. Further, nd represents the refractive index for the d-line of each optical member, and vd represents the Abbe number of the optical member. The Abbe number vd of a certain material is expressed as:

$$vd=(Nd-1)/(NF-NC),$$

where Nd, NF, NC, and Ng are a refractive index in a d-line (587.56 nm), a refractive index in an F-line (486.1 nm), a refractive index in a C-line (656.3 nm), and a refractive index in a g-line (a wavelength of 435.835 nm), respectively, of the Fraunhofer's lines.

In each of the first to eighth numeric examples, each of a focal length (mm), a F-number, and a half angle of view (degree) is a value in the case of when the zoom lens B0 according to the corresponding exemplary embodiment is focused on the infinity object. Back focus BF is an air equivalent length from the last lens surface to the image plane. A total lens length is a value calculated by adding the back focus BF to the distance in the optical axis from the first lens surface to the last lens surface.

In the surface data, "*" of the surface number indicates the surface having an aspherical shape. The aspherical shape is expressed by the following expression (1):

$$X = \frac{H^2/R}{1 + \sqrt{1 - (1+K)(H/R)^2}} + A4 \cdot H^4 + A6 \cdot H^6 + \\ A8 \cdot H^8 + A10 \cdot H^{10} + A12 \cdot H^{12} + A14 \cdot H^{14} + A16 \cdot H^{16} \quad (1)$$

where X is an X-axis in the optical axis direction, H is an H-axis in the direction perpendicular to the optical axis, while a light traveling direction is positive, R is a paraxial curvature radius, K is a conic constant, and Aj is a jth-order aspherical surface coefficient. In the aspherical coefficient, "e−y" indicates $10^{-y}$.

First Numeric Example

Surface Data

| Surface Number | r | d | nd | vd | Effective Diameter |
|---|---|---|---|---|---|
| 1 | 81.305 | 1.15 | 1.63854 | 55.4 | 31.11 |
| 2 | 14.228 | 8.51 | | | 23.92 |
| 3* | −1000.000 | 2.00 | 1.53110 | 55.9 | 23.61 |
| 4* | 54.155 | 0.70 | | | 23.70 |
| 5 | 201.759 | 2.26 | 1.84666 | 23.8 | 23.47 |
| 6 | −109.647 | (Variable) | | | 23.24 |
| 7 | 154.918 | 1.80 | 1.51742 | 52.4 | 10.00 |
| 8 | −41.663 | 1.69 | | | 10.19 |
| 9 (Stop) | ∞ | 1.00 | | | 10.33 |
| 10 | 13.449 | 3.04 | 1.59522 | 67.7 | 10.47 |
| 11 | 519.400 | (Variable) | | | 9.94 |
| 12 | −462.121 | 0.60 | 1.84666 | 23.8 | 8.86 |
| 13 | 29.053 | (Variable) | | | 8.66 |
| 14* | −144.347 | 1.64 | 1.58313 | 59.4 | 9.90 |
| 15 | −64.118 | (Variable) | | | 10.53 |
| Image Plane | ∞ | | | | |

Aspherical Data

Third Surface

K = 0  A4 = −6.16999e−005  A6 = 9.64091e−008
A8 = −6.24666e−010  A10 = 1.15838e−011  A12 = 5.52161e−014

Fourth Surface

K = 0  A4 = −7.58020e−005  A6 = −6.07857e−010
A8 = 1.24373e−009  A10 = −5.09126e−012  A12 = −7.700126e−015

Fourteenth Surface

K = 0  A4 = −8.02055e−005  A6 = −6.36693e−007
A8 = −8.04272e−010  A10 = −6.04362e−011

Various Data
Zoom Ratio 2.82

| | Wide-Angle | Intermediate | Telephoto |
|---|---|---|---|
| Focal length | 15.46 | 24.00 | 43.65 |
| F-number | 4.16 | 4.92 | 6.50 |
| Half Angle of View (Degree) | 38.73 | 29.65 | 17.38 |
| Image Height | 12.40 | 13.66 | 13.66 |
| Total Lens Length | 96.84 | 85.69 | 84.27 |
| BF | 26.19 | 34.03 | 49.18 |
| d6 | 36.48 | 17.48 | 0.92 |
| d11 | 1.54 | 1.60 | 2.61 |
| d13 | 8.25 | 8.19 | 7.18 |
| d15 | 26.19 | 34.03 | 49.18 |

Zoom Lens Unit Data

| Unit | Start Surface | Focal Length | Lens Configuration Length | Front Principal Point Position | Rear Principal Point Position |
|---|---|---|---|---|---|
| 1 | 1 | −29.62 | 14.62 | −0.18 | −13.24 |
| 2 | 7 | 17.56 | 7.52 | 3.13 | −2.75 |
| 3 | 12 | −32.27 | 0.60 | 0.31 | −0.02 |
| 4 | 14 | 196.35 | 1.64 | 1.85 | 0.82 |

Single Lens Data

| Lens | Start Surface | Focal Length |
|---|---|---|
| 1 | 1 | −27.19 |
| 2 | 3 | −96.67 |
| 3 | 5 | 84.19 |
| 4 | 7 | 63.65 |
| 5 | 10 | 23.14 |
| 6 | 12 | −32.27 |
| 7 | 14 | 196.35 |

Second Numeric Example

Surface Data

| Surface Number | r | d | nd | vd | Effective Diameter |
|---|---|---|---|---|---|
| 1 | 26.941 | 1.00 | 1.63854 | 55.4 | 24.79 |
| 2 | 12.045 | 7.49 | | | 20.24 |
| 3* | −1000.000 | 1.70 | 1.53110 | 55.9 | 19.64 |
| 4* | 33.260 | 0.40 | | | 19.29 |
| 5 | 46.469 | 1.94 | 1.84666 | 23.8 | 19.03 |
| 6 | 174.749 | (Variable) | | | 18.63 |
| 7 | 139.916 | 1.73 | 1.69680 | 55.5 | 8.98 |
| 8 | −44.483 | 1.00 | | | 9.12 |
| 9 (Stop) | ∞ | 1.50 | | | 9.16 |
| 10 | 16.314 | 2.57 | 1.77250 | 49.6 | 9.23 |
| 11 | 156.410 | (Variable) | | | 8.76 |
| 12 | −384.505 | 0.70 | 1.84666 | 23.8 | 7.92 |
| 13 | 20.582 | (Variable) | | | 7.71 |
| 14* | −312.236 | 2.08 | 1.53110 | 55.9 | 10.79 |
| 15* | −28.811 | (Variable) | | | 11.46 |
| Image Plane | ∞ | | | | |

Aspherical Data

Third Surface

K = 0  A4 = −1.41463e−004  A6 = 7.66013e−007
A8 = −1.27190e−009  A10 = −1.10963e−011

Fourth Surface

K = 0  A4 = −1.69055e−004  A6 = 8.63631e−007
A8 = −2.53183e−009  A10 = −7.27576e−012

Fourteenth Surface

K = 0  A4 = −9.44164e−006  A6 = 5.54551e−007
A8 = −1.94972e−008  A10 = 2.35602e−010

Fifteenth Surface

K = 0  A4 = 3.12388e−005  A6 = 2.31800e−007

Various Data
Zoom Ratio 2.35

| | Wide-Angle | Intermediate | Telephoto |
|---|---|---|---|
| Focal Length | 18.53 | 30.00 | 43.65 |
| F-number | 4.56 | 5.48 | 6.50 |
| Half Angle of View (Degree) | 33.78 | 24.48 | 17.38 |
| Image Height | 12.40 | 13.66 | 13.66 |

-continued

|  | | | |
|---|---|---|---|
| Total Lens Length | 89.11 | 81.23 | 81.40 |
| BF | 28.48 | 38.21 | 47.77 |
| d6 | 28.48 | 10.86 | 1.48 |
| d11 | 1.53 | 1.64 | 2.28 |
| d13 | 8.52 | 8.41 | 7.77 |
| d15 | 28.48 | 38.21 | 47.77 |

Zoom Lens Unit Data

| Unit | Start Surface | Focal Length | Lens Configuration Length | Front Principal Point Position | Rear Principal Point Position |
|---|---|---|---|---|---|
| 1 | 1 | −31.01 | 12.52 | 1.87 | −8.64 |
| 2 | 7 | 16.38 | 6.79 | 2.58 | −2.47 |
| 3 | 12 | −23.06 | 0.70 | 0.36 | −0.02 |
| 4 | 14 | 59.61 | 2.08 | 1.50 | 0.14 |

Single Lens Data

| Lens | Start Surface | Focal Length |
|---|---|---|
| 1 | 1 | −35.03 |
| 2 | 3 | −60.57 |
| 3 | 5 | 74.25 |
| 4 | 7 | 48.63 |
| 5 | 10 | 23.39 |
| 6 | 12 | −23.06 |
| 7 | 14 | 59.61 |

Third Numeric Example

Surface Data

| Surface Number | r | d | nd | vd | Effective Diameter |
|---|---|---|---|---|---|
| 1 | 35.854 | 1.00 | 1.77250 | 49.6 | 26.50 |
| 2 | 14.573 | 7.47 | | | 22.24 |
| 3* | −1000.000 | 1.70 | 1.53110 | 55.9 | 21.69 |
| 4* | 45.253 | 0.40 | | | 21.52 |
| 5 | 42.410 | 2.16 | 1.85478 | 24.8 | 21.16 |
| 6 | 140.853 | (Variable) | | | 20.73 |
| 7 | 128.816 | 1.73 | 1.67790 | 55.3 | 9.08 |
| 8 | −46.174 | 1.00 | | | 9.20 |
| 9 (Stop) | ∞ | 1.50 | | | 9.21 |
| 10 | 15.569 | 2.03 | 1.88300 | 40.8 | 9.23 |
| 11 | 134.614 | (Variable) | | | 8.83 |
| 12 | −133.172 | 0.70 | 1.84666 | 23.8 | 8.13 |
| 13 | 17.103 | (Variable) | | | 7.86 |
| 14* | −181.303 | 2.43 | 1.53110 | 55.9 | 9.56 |
| 15* | −26.048 | (Variable) | | | 10.37 |
| Image Plane | ∞ | | | | |

Aspherical Data

Third Surface

K = 0  A4 = −1.42036e−004  A6 = 6.81082e−007
A8 = −1.27645e−009  A10 = −2.59087e−012

Fourth Surface

K = 0  A4 = −1.54470e−004  A6 = 8.17822e−007
A8 = −2.40245e−009  A10 = 7.64264e−013

Fourteenth Surface

K = 0  A4 = 3.90803e−005  A6 = 2.26763e−006
A8 = −3.71828e−008  A10 = 5.18172e−010

Fifteenth Surface

K = 0  A4 = 6.95347e−005  A6 = 1.53424e−006

Various Data
Zoom Ratio 2.35

|  | Wide-Angle | Intermediate | Telephoto |
|---|---|---|---|
| Focal Length | 18.53 | 30.00 | 43.65 |
| F-number | 4.53 | 5.43 | 6.50 |
| Half Angle of View (Degree) | 33.78 | 24.48 | 17.38 |
| Image Height | 12.40 | 13.66 | 13.66 |
| Total Lens Length | 92.00 | 80.75 | 81.34 |
| BF | 29.45 | 38.60 | 49.50 |
| d6 | 32.32 | 11.91 | 1.60 |
| d11 | 1.58 | 1.58 | 1.58 |
| d13 | 6.54 | 6.54 | 6.54 |
| d15 | 29.45 | 38.60 | 49.50 |

Zoom Lens Unit Data

| Unit | Start Surface | Focal Length | Lens Configuration Length | Front Principal Point Position | Rear Principal Point Position |
|---|---|---|---|---|---|
| 1 | 1 | −35.20 | 12.73 | 0.44 | −10.40 |
| 2 | 7 | 14.75 | 6.25 | 2.72 | −1.98 |
| 3 | 12 | −17.86 | 0.70 | 0.34 | −0.04 |
| 4 | 14 | 56.97 | 2.43 | 1.84 | 0.26 |

Single Lens Data

| Lens | Start Surface | Focal Length |
|---|---|---|
| 1 | 1 | −32.45 |
| 2 | 3 | −81.47 |
| 3 | 5 | 70.28 |
| 4 | 7 | 50.34 |
| 5 | 10 | 19.78 |
| 6 | 12 | −17.86 |
| 7 | 14 | 56.97 |

Fourth Numeric Example

Surface Data

| Surface Number | r | d | nd | vd | Effective Diameter |
|---|---|---|---|---|---|
| 1 | 45.893 | 1.00 | 1.63854 | 55.4 | 27.09 |
| 2 | 14.386 | 7.03 | | | 22.30 |
| 3 | −85.298 | 1.70 | 1.53110 | 55.9 | 21.78 |
| 4* | 97.643 | 0.40 | | | 21.12 |
| 5 | 23.337 | 2.24 | 1.84666 | 23.8 | 20.54 |
| 6 | 34.716 | (Variable) | | | 19.79 |
| 7 (Stop) | ∞ | 1.00 | | | 9.02 |
| 8* | 16.308 | 2.56 | 1.77250 | 49.6 | 9.36 |
| 9 | −58.463 | (Variable) | | | 9.12 |
| 10 | 42172.073 | 0.60 | 1.80810 | 22.8 | 8.03 |
| 11 | 19.038 | (Variable) | | | 7.82 |
| 12* | −263.369 | 2.08 | 1.53110 | 55.9 | 10.58 |
| 13 | −27.990 | (Variable) | | | 11.27 |
| Image Plane | ∞ | | | | |

Aspherical Data

Fourth Surface

K = 0  A4 = −4.47785e−006  A6 = 4.80655e−008
A8 = −5.32262e−010  A10 = 1.27701e−012

Eighth Surface

K = 0  A4 = −3.43112e−005  A6 = 3.14927e−008
A8 = −2.95172e−009  A10 = 4.26192e−011

-continued

Twelfth Surface

| | | |
|---|---|---|
| K = 0 | A4 = −3.22505e−005 | A6 = 1.56251e−007 |
| A8 = −1.96015e−008 | A10 = 3.12929e−010 | |

Various Data
Zoom Ratio 2.35

| | Wide-Angle | Intermediate | Telephoto |
|---|---|---|---|
| Focal Length | 18.53 | 26.00 | 43.60 |
| F-number | 4.56 | 5.17 | 6.50 |
| Half Angle of View (Degree) | 33.79 | 27.72 | 17.40 |
| Image Height | 12.40 | 13.66 | 13.66 |
| Total Lens Length | 91.32 | 83.11 | 80.48 |
| BF | 29.73 | 36.16 | 48.88 |
| d6 | 32.64 | 18.00 | 2.64 |
| d9 | 2.37 | 2.28 | 2.75 |
| d11 | 7.98 | 8.08 | 7.61 |
| d13 | 29.73 | 36.16 | 48.88 |

Zoom Lens Unit Data

| Unit | Start Surface | Focal Length | Lens Configuration Length | Front Principal Point Position | Rear Principal Point Position |
|---|---|---|---|---|---|
| 1 | 1 | −34.13 | 12.37 | 1.21 | −8.90 |
| 2 | 7 | 16.76 | 3.56 | 1.32 | −1.14 |
| 3 | 10 | −23.57 | 0.60 | 0.33 | 0.00 |
| 4 | 12 | 58.79 | 2.08 | 1.51 | 0.16 |

Single Lens Data

| Lens | Start Surface | Focal Length |
|---|---|---|
| 1 | 1 | −33.23 |
| 2 | 3 | −85.45 |
| 3 | 5 | 77.13 |
| 4 | 8 | 16.76 |
| 5 | 10 | −23.57 |
| 6 | 12 | 58.79 |

Fifth Numeric Example

Surface Data

| Surface Number | r | d | nd | vd | Effective Diameter |
|---|---|---|---|---|---|
| 1 | 51.714 | 1.15 | 1.72916 | 54.7 | 30.45 |
| 2 | 15.131 | 9.48 | | | 24.47 |
| 3* | −68.368 | 2.00 | 1.53110 | 55.9 | 23.99 |
| 4* | −1234.568 | 0.30 | | | 24.30 |
| 5 | −202.690 | 2.04 | 1.84666 | 23.8 | 24.02 |
| 6 | −65.810 | (Variable) | | | 23.91 |
| 7 | 211.787 | 1.75 | 1.60311 | 60.6 | 10.34 |
| 8 | −48.064 | 1.71 | | | 10.50 |
| 9 (Stop) | ∞ | 1.00 | | | 10.59 |
| 10 | 12.750 | 2.89 | 1.51823 | 58.9 | 10.70 |
| 11 | −61.135 | (Variable) | | | 10.28 |
| 12 | −53.415 | 0.60 | 1.85478 | 24.8 | 9.18 |
| 13 | 52.610 | (Variable) | | | 8.98 |
| 14* | 444.819 | 1.50 | 1.53110 | 55.9 | 9.76 |
| 15 | 95.657 | (Variable) | | | 10.33 |
| Image Plane | ∞ | | | | |

Aspherical Data

Third Surface

| | | |
|---|---|---|
| K = 0 | A4 = −6.37596e−005 | A6 = 5.59365e−007 |
| A8 = −6.75504e−009 | A10 = 4.19523e−011 | A12 = −1.04577e−013 |

Fourth Surface

| | | |
|---|---|---|
| K = 0 | A4 = −6.85609e−005 | A6 = 4.64163e−007 |
| A8 = −5.211226−009 | A10 = 2.99013e−011 | A12 = −7.12555e−014 |

Fourteenth Surface

| | | |
|---|---|---|
| K = 0 | A4 = −1.15845e−004 | A6 = −7.75571e−007 |
| A8 = −3.94565e−009 | A10 = −5.60854e−011 | |

Various Data
Zoom Ratio 2.66

| | Wide-Angle | Intermediate | Telephoto |
|---|---|---|---|
| Focal Length | 16.41 | 24.00 | 43.65 |
| F-number | 4.21 | 4.90 | 6.50 |
| Half Angle of View (Degree) | 37.08 | 29.65 | 17.38 |
| Image Height | 12.40 | 13.66 | 13.66 |
| Total Lens Length | 99.00 | 87.77 | 83.61 |
| BF | 24.60 | 31.13 | 45.64 |
| d6 | 39.49 | 21.74 | 3.07 |
| d11 | 1.49 | 1.49 | 2.08 |
| d13 | 8.99 | 9.00 | 8.40 |
| d15 | 24.60 | 31.13 | 45.64 |

Zoom Lens Unit Data

| Unit | Start Surface | Focal Length | Lens Configuration Length | Front Principal Point Position | Rear Principal Point Position |
|---|---|---|---|---|---|
| 1 | 1 | −32.74 | 14.97 | −0.48 | −14.20 |
| 2 | 7 | 16.29 | 7.36 | 3.46 | −2.41 |
| 3 | 12 | −30.93 | 0.60 | 0.16 | −0.16 |
| 4 | 14 | −229.80 | 1.50 | 1.25 | 0.27 |

Single Lens Data

| Lens | Start Surface | Focal Length |
|---|---|---|
| 1 | 1 | −29.73 |
| 2 | 3 | −136.36 |
| 3 | 5 | 114.32 |
| 4 | 7 | 65.12 |
| 5 | 10 | 20.63 |
| 6 | 12 | −30.93 |
| 7 | 14 | −229.80 |

Sixth Numeric Example

Surface Data

| Surface Number | r | d | nd | vd | Effective Diameter |
|---|---|---|---|---|---|
| 1 | 32.515 | 1.00 | 1.67790 | 55.3 | 25.08 |
| 2 | 13.169 | 6.71 | | | 20.91 |
| 3* | −1000.000 | 1.70 | 1.53110 | 55.9 | 20.46 |
| 4* | 45.486 | 0.40 | | | 20.10 |
| 5 | 23.627 | 2.02 | 2.00069 | 25.5 | 19.69 |
| 6 | 34.676 | (Variable) | | | 19.02 |
| 7 | 115.005 | 1.73 | 1.72916 | 54.7 | 9.08 |
| 8 | −48.763 | 1.00 | | | 9.14 |
| 9 (Stop) | ∞ | 1.50 | | | 9.05 |
| 10 | 14.904 | 2.63 | 1.72916 | 54.7 | 8.93 |
| 11 | −272.635 | (Variable) | | | 8.42 |
| 12 | −35.401 | 0.70 | 1.90366 | 31.3 | 7.72 |
| 13 | 17.894 | (Variable) | | | 7.53 |
| 14* | −80.549 | 2.34 | 1.53110 | 55.9 | 8.98 |
| 15* | −13.809 | (Variable) | | | 9.84 |
| Image Plane | ∞ | | | | |

-continued

Aspherical Data

Third Surface

K = 0  A4 = −2.82744e−005  A6 = −4.01528e−007
A8 = 4.70130e−009  A10 = −1.93064e−011

Fourth Surface

K = 0  A4 = −3.88075e−005  A6 = −4.28587e−007
A8 = 4.87774e−009  A10 = −2.07859e−011

Fourteenth Surface

K = 0  A4 = −4.11964e−005  A6 = 6.94293e−007
A8 = −5.20928e−008  A10 = 1.13182e−009

Fifteenth Surface

K = 0  A4 = −8.49430e−006  A6 = −1.54892e−007

Various Data
Zoom Ratio 2.18

| | Wide-Angle | Intermediate | Telephoto |
|---|---|---|---|
| Focal Length | 20.01 | 27.00 | 43.65 |
| F-number | 4.60 | 5.15 | 6.50 |
| Half Angle of View (Degree) | 31.79 | 26.84 | 17.38 |
| Image Height | 12.40 | 13.66 | 13.66 |
| Total Lens Length | 92.00 | 84.32 | 83.15 |
| BF | 33.77 | 39.37 | 52.69 |
| d6 | 30.31 | 17.03 | 2.54 |
| d11 | 1.63 | 1.63 | 1.63 |
| d13 | 4.57 | 4.57 | 4.57 |
| d15 | 33.77 | 39.37 | 52.69 |

Zoom Lens Unit Data

| Unit | Start Surface | Focal Length | Lens Configuration Length | Front Principal Point Position | Rear Principal Point Position |
|---|---|---|---|---|---|
| 1 | 1 | −35.80 | 11.83 | 1.24 | −8.34 |
| 2 | 7 | 14.40 | 6.86 | 2.83 | −2.33 |
| 3 | 12 | −13.07 | 0.70 | 0.24 | −0.12 |
| 4 | 14 | 31.00 | 2.34 | 1.82 | 0.31 |

Single Lens Data

| Lens | Start Surface | Focal Length |
|---|---|---|
| 1 | 1 | −33.35 |
| 2 | 3 | −81.87 |
| 3 | 5 | 67.89 |
| 4 | 7 | 47.17 |
| 5 | 10 | 19.46 |
| 6 | 12 | −13.07 |
| 7 | 14 | 31.00 |

Seventh Numeric Example

Surface Data

| Surface Number | r | d | nd | vd | Effective Diameter |
|---|---|---|---|---|---|
| 1 | 48.059 | 1.00 | 1.63854 | 55.4 | 26.32 |
| 2 | 14.114 | 7.33 | | | 21.64 |
| 3* | −1000.000 | 1.70 | 1.53110 | 55.9 | 21.08 |
| 4* | 51.376 | 0.40 | | | 20.96 |
| 5 | 49.503 | 1.99 | 1.84666 | 23.8 | 20.55 |
| 6 | 177.062 | (Variable) | | | 20.15 |
| 7 | 127.256 | 1.73 | 1.67790 | 55.3 | 9.12 |
| 8 | −47.359 | 1.00 | | | 9.25 |
| 9 (Stop) | ∞ | 1.50 | | | 9.27 |
| 10 | 17.235 | 2.61 | 1.80400 | 46.6 | 9.31 |
| 11 | 358.823 | (Variable) | | | 8.84 |
| 12 | −117.524 | 0.70 | 1.84666 | 23.8 | 8.08 |
| 13 | 21.736 | 7.12 | | | 7.87 |
| 14* | −221.529 | 2.41 | 1.53110 | 55.9 | 10.05 |
| 15* | −28.819 | (Variable) | | | 10.82 |
| Image Plane | ∞ | | | | |

Aspherical Data

Third Surface

K = 0  A4 = −1.24978e−004  A6 = 2.71294e−007
A8 = 1.41979e−009  A10 = −9.72356e−012

Fourth Surface

K = 0  A4 = −1.37193e−004  A6 = 3.71703e−007
A8 = 7.25801e−010  A10 = −7.69387e−012

Fourteenth Surface

K = 0  A4 = 4.49135e−005  A6 = 1.54680e−006
A8 = −2.35020e−008  A10 = 2.913196e−010

Fifteenth Surface

K = 0  A4 = 7.57248e−005  A6 = 1.14052e−006

Various Data
Zoom Ratio 2.36

| | Wide-Angle | Intermediate | Telephoto |
|---|---|---|---|
| Focal Length | 18.53 | 27.00 | 43.65 |
| F-number | 4.56 | 5.23 | 6.50 |
| Half Angle of View (Degree) | 33.79 | 26.84 | 17.38 |
| Image Height | 12.40 | 13.66 | 13.66 |
| Total Lens Length | 92.00 | 82.86 | 81.68 |
| BF | 29.46 | 36.42 | 48.75 |
| d6 | 31.48 | 15.36 | 1.50 |
| d11 | 1.56 | 1.59 | 1.93 |
| d15 | 29.46 | 36.42 | 48.75 |

Zoom Lens Unit Data

| Unit | Start Surface | Focal Length | Lens Configuration Length | Front Principal Point Position | Rear Principal Point Position |
|---|---|---|---|---|---|
| 1 | 1 | −33.74 | 12.42 | 0.44 | −10.21 |
| 2 | 7 | 16.19 | 6.84 | 2.71 | −2.37 |
| 3 | 12 | −42.61 | 10.23 | −5.84 | −17.47 |

Single Lens Data

| Lens | Start Surface | Focal Length |
|---|---|---|
| 1 | 1 | −31.66 |
| 2 | 3 | −91.96 |
| 3 | 5 | 80.58 |
| 4 | 7 | 51.12 |
| 5 | 10 | 22.44 |
| 6 | 12 | −21.62 |
| 7 | 14 | 62.11 |

Eighth Numeric Example

Surface Data

| Surface Number | r | d | nd | vd | Effective Diameter |
|---|---|---|---|---|---|
| 1 | 26.077 | 1.00 | 1.48749 | 70.2 | 20.69 |
| 2 | 11.855 | 6.10 | | | 17.78 |

-continued

| | | | | | |
|---|---|---|---|---|---|
| 3* | −46.388 | 1.70 | 1.53110 | 55.9 | 17.07 |
| 4 | 66.382 | 0.40 | | | 16.45 |
| 5 | 18.651 | 2.51 | 1.51742 | 52.4 | 16.13 |
| 6 | 49.111 | (Variable) | | | 15.55 |
| 7 (Stop) | ∞ | 1.00 | | | 4.92 |
| 8 | 38.354 | 1.54 | 1.49700 | 81.5 | 5.00 |
| 9 | −53.188 | 1.47 | | | 5.01 |
| 10 | 8.415 | 1.67 | 1.56732 | 42.8 | 4.95 |
| 11 | 27.462 | (Variable) | | | 4.61 |
| 12 | 15.014 | 0.60 | 1.82115 | 24.1 | 4.57 |
| 13* | 7.963 | (Variable) | | | 4.57 |
| Image Plane | ∞ | | | | |

Aspherical Data

Third Surface $K = 0$  $A4 = 2.68514e{-}007$  $A6 = 3.76986e{-}008$
$A8 = -7.83455e{-}010$  $A10 = 4.73817e{-}012$ Thirteenth Surface $K = 0$  $A4 = 1.28808e{-}004$  $A6 = -1.62031e{-}005$
$A8 = 3.98366e{-}006$  $A10 = -2.76591e{-}007$ Various Data
Zoom Ratio 1.45

| | Wide-Angle | Intermediate | Telephoto |
|---|---|---|---|
| Focal Length | 24.50 | 26.73 | 35.50 |
| F-number | 9.41 | 9.73 | 11.00 |
| Half Angle of View (Degree) | 26.84 | 27.07 | 21.05 |
| Image Height | 12.40 | 13.66 | 13.66 |
| Total Lens Length | 85.00 | 82.28 | 76.68 |
| BF | 36.70 | 38.07 | 43.53 |
| d6 | 28.80 | 24.69 | 13.57 |
| d11 | 1.50 | 1.52 | 1.59 |
| d13 | 36.70 | 38.07 | 43.53 |

Zoom Lens Unit Data

| Unit | Start Surface | Focal Length | Lens Configuration Length | Front Principal Point Position | Rear Principal Point Position |
|---|---|---|---|---|---|
| 1 | 1 | −41.72 | 11.71 | 1.67 | −8.18 |
| 2 | 7 | 14.56 | 5.69 | 2.57 | −2.01 |
| 3 | 12 | −21.47 | 0.60 | 0.73 | 0.39 |

Single Lens Data

| Lens | Start Surface | Focal Length |
|---|---|---|
| 1 | 1 | −45.64 |
| 2 | 3 | −51.15 |
| 3 | 5 | 56.53 |
| 4 | 8 | 45.09 |
| 5 | 10 | 20.73 |
| 6 | 12 | −21.47 |

Various values in each of the first to eighth numeric examples are summarized in the following Table 1.

TABLE 1

| | First Example | Second Example | Third Example | Fourth Example | Fifth Example | Sixth Example | Seventh Example | Eighth Example |
|---|---|---|---|---|---|---|---|---|
| Nd_G1 | 1.6385 | 1.6385 | 1.7725 | 1.6385 | 1.7292 | 1.6779 | 1.6385 | 1.4875 |
| SF_B3n | −0.88 | −0.90 | −0.77 | −1.00 | −0.01 | −0.33 | −0.69 | −3.26 |
| \|f1\|/fw | 1.92 | 1.67 | 1.90 | 1.84 | 2.00 | 1.79 | 1.82 | 1.70 |
| f2/fw | 1.14 | 0.88 | 0.80 | 0.90 | 0.99 | 0.72 | 0.87 | 0.59 |
| f3/f1 | 1.09 | 0.74 | 0.51 | 0.69 | 0.94 | 0.37 | 1.26 | 0.51 |
| vd_B3n | 23.78 | 23.78 | 23.78 | 22.76 | 24.80 | 31.32 | 23.78 | 24.06 |

[Image Capturing Apparatus]

Figure 17:
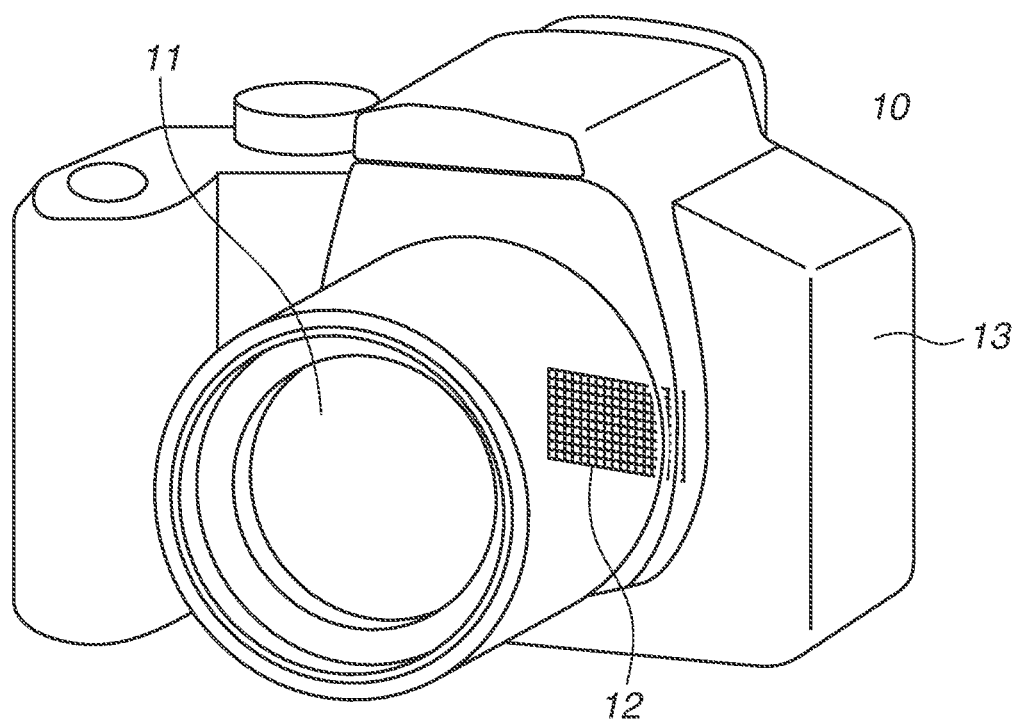
FIG. 17 is a schematic diagram illustrating an image capturing apparatus.

Next, a description will be given of an exemplary embodiment with reference to FIG. 17 in which a digital still camera (an image capturing apparatus) 10 employs the zoom lens according to any of the exemplary embodiments as an imaging optical system. FIG. 17 illustrates a camera body 13 and an image-capturing optical system 11 including the zoom lens B0 described in any of the first to eighth exemplary embodiments. A solid-state image sensor (a photoelectric conversion element) 12, such as a CCD sensor and CMOS sensor, is disposed in the camera body 13. The solid-state image sensor 12 receives an optical image formed by the image-capturing optical system 11, and photoelectrically converts the received optical image. The camera body 13 may be a single-lens reflex camera having a quick turn mirror, or may be a mirrorless camera not having a quick turn mirror.

In the above-described way, the zoom lens according to any of the exemplary embodiments of the disclosure is applied to the image capturing apparatus, such as a digital still camera, whereby an image capturing apparatus having excellent optical performance while being light in weight can be obtained.

The zoom lens according to each of the above-described exemplary embodiments is not limited to the image capturing apparatus, such as a digital still camera, and is applicable to various optical apparatuses, such as a telescope.

Some exemplary embodiments and examples of the disclosure are described above, but the disclosure is not limited to these exemplary embodiments and examples, and various combinations, alterations, and modifications can be made without departing from the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-215441, filed Nov. 28, 2019, which is hereby incorporated by reference herein in its entirety.

What is claimed is:

1. A zoom lens comprising:
a first lens unit having negative refractive power,
a second lens unit having positive refractive power and lenses included in the second lens unit are all positive single lenses, and
a third lens unit having negative refractive power in order from an object side to an image side,
wherein a distance between the first lens unit and the second lens unit and a distance between the second lens unit and the third lens unit change during at least one of zooming and focusing, wherein the first lens unit moves during zooming, wherein the first lens unit includes a negative lens G1 disposed closest to the object side and at least one positive lens, wherein the second lens unit consists of an aperture stop, a first positive lens, a second positive lens, and lenses included in the second lens unit are all positive single lenses, wherein a number of lenses included in the third lens unit is two or less, wherein the third lens unit moves toward the image side during focusing from infinity to close range, and wherein the following inequalities are satisfied:

$$1.40<Nd\_G1<1.80$$

$$18<vd\_B3n\leq24.8$$

where Nd_G1 is a refractive index of the negative lens G1, and vd_B3$n$ is an Abbe number of a negative lens having strongest refractive power among negative lenses included in the third lens unit.

2. The zoom lens according to claim 1, wherein the following inequality is satisfied:

$$-5.0<SF\_B3n<0.50$$

where SF_B3$n$ is a shape factor of a negative lens having strongest negative refractive power among the third lens unit.

3. The zoom lens according to claim 1, wherein the following inequality is satisfied:

$$1.0<|f1|/fw<3.0$$

where fw is a focal length at a wide angle end of the zoom lens, and f1 is a focal length of the first lens unit.

4. The zoom lens according to claim 1, wherein the following inequality is satisfied:

$$0.2<f2/fw<5.0$$

where f2 is a focal length of the second lens unit, and fw is a focal length at a wide angle end of the zoom lens.

5. The zoom lens according to claim 1, wherein the following inequality is satisfied:

$$0.1<f3/f1<5.0$$

where f3 is a focal length of the third lens unit, and f1 is a focal length of the first lens unit.

6. The zoom lens according to claim 1, wherein a number of lenses included from a lens disposed closest to the object side in the second lens unit to a lens closest to the image side in the zoom lens is five or less.

7. The zoom lens according to claim 1, wherein the third lens unit consists of a single lens having negative refractive power.

8. The zoom lens according to claim 1, wherein the first lens unit includes an aspherical lens.

9. The zoom lens according to claim 8, wherein the aspherical lens is a resin lens.

10. The zoom lens according to claim 1, wherein at least a part of the second lens unit moves in a direction including a component perpendicular to an optical axis in image blurring correction.

11. The zoom lens according to claim 1, further comprising a fourth lens unit having positive refractive power disposed adjacent to an image side of the third lens group, wherein during zooming, the second lens unit and the fourth lens unit integrally moves, and a distance between the third lens unit and the fourth lens unit changes.

12. The zoom lens according to claim 11, wherein the third lens unit consists of one biconcave lens.

13. The zoom lens according to claim 11, wherein the fourth lens unit consists of one lens.

14. The zoom lens according to claim 1, wherein the second lens unit consists of the first positive lens, the aperture stop and the second positive lens, arranged in order from the object side to the image side.

15. The zoom lens according to claim 14, wherein the first positive lens is arranged with a convex surface facing the image side, and the second positive lens is arranged with a convex surface facing the object side.

16. The zoom lens according to claim 1, wherein the second lens unit consists of the aperture stop, the first positive lens and the second positive lens, arranged in order from the object side to the image side.

17. The zoom lens according to claim 16, wherein the first positive lens is arranged with a convex surface facing the image side, and the second positive lens is arranged with a convex surface facing the object side.

18. An image capturing apparatus comprising:
a zoom lens; and
an image sensor configured to capture an optical image formed by the zoom lens,
wherein the zoom lens comprises:
a first lens unit having negative refractive power,
a second lens unit having positive refractive power, and
a third lens unit having negative refractive power in order from an object side to an image side,
wherein a distance between the first lens unit and the second lens unit and a distance between the second lens unit and the third lens unit change during at least one of zooming and focusing,
wherein the first lens unit moves during zooming,
wherein the first lens unit includes a negative lens G1 disposed closest to the object side and at least one positive lens,
wherein the second lens unit consists of an aperture stop, a first positive lens, a second positive lens, and lenses included in the second lens unit are all positive single lenses,
wherein a number of lenses included in the third lens unit is two or less,
wherein the third lens unit moves toward the image side during focusing from infinity to close range, and
wherein the following inequalities are satisfied:

$$1.40<Nd\_G1<1.80$$

$$18<vd\_B3n\leq24.8$$

where Nd_G1 is a refractive index of the negative lens G1, and vd_B3$n$ is an Abbe number of a negative lens having strongest refractive power among negative lenses included in the third lens unit.

19. The image capturing apparatus according to claim 18, wherein, in the zoom lens, the following inequality is satisfied:

$$-5.0<SF\_B3n<0.50$$

where SF_B3$n$ is a shape factor of a negative lens having strongest refractive power among negative lenses included in the third lens unit.

20. The image capturing apparatus according to claim 18, wherein, in the zoom lens, the following inequality is satisfied:

$$1.0<|f1|/fw<3.0$$

where fw is a focal length at a wide angle end of the zoom lens, and f1 is a focal length of the first lens unit.

21. The image capturing apparatus according to claim 18, wherein, in the zoom lens, the following inequality is satisfied:

$$0.2 < f2/fw < 5.0$$

where f2 is a focal length of the second lens unit, and fw is a focal length at a wide angle end of the zoom lens.

22. The image capturing apparatus according to claim 18, wherein, in the zoom lens, the following inequality is satisfied:

$$0.1 < f3/f1 < 5.0$$

where f3 is a focal length of the third lens unit, and f1 is a focal length of the first lens unit.

23. The image capturing apparatus according to claim 18, wherein, in the zoom lens, a number of lenses included from a lens disposed closest to the object side in the second lens unit to a lens closest to the image side in the zoom lens is five or less.

24. The image capturing apparatus according to claim 18, wherein the zoom lens further comprises a fourth lens unit having positive refractive power disposed adjacent to an image side of the third lens group, and during zooming, the second lens unit and the fourth lens unit integrally moves, and a distance between the third lens unit and the fourth lens unit changes.

\* \* \* \* \*